(12) United States Patent
Kondo et al.

(10) Patent No.: US 11,598,922 B2
(45) Date of Patent: Mar. 7, 2023

(54) OPTICAL RECEPTACLE AND OPTICAL TRANSCEIVER

(71) Applicant: Adamant Namiki Precision Jewel Co., Ltd., Tokyo (JP)

(72) Inventors: Sho Kondo, Kitakyushu (JP); Hirotsugu Agatsuma, Kitakyushu (JP); Satoshi Kaneyuki, Kitakyushu (JP); Satoshi Hakozaki, Kitakyushu (JP); Hiroki Sato, Kitakyushu (JP); Kohei Tominaga, Kitakyushu (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 0 days.

(21) Appl. No.: 17/069,225

(22) Filed: Oct. 13, 2020

(65) Prior Publication Data
US 2021/0041636 A1 Feb. 11, 2021

Related U.S. Application Data

(63) Continuation of application No. 16/234,877, filed on Dec. 28, 2018, now abandoned, which is a (Continued)

(30) Foreign Application Priority Data

Jun. 29, 2016 (JP) .............................. JP2016-129047
Jun. 29, 2017 (JP) .............................. JP2017-127001

(51) Int. Cl.
*G02B 6/38* (2006.01)
*G02B 6/42* (2006.01)
(Continued)

(52) U.S. Cl.
CPC ....... *G02B 6/3846* (2013.01); *G02B 6/02028* (2013.01); *G02B 6/262* (2013.01); *G02B 6/3835* (2013.01); *G02B 6/421* (2013.01)

(58) Field of Classification Search
None
See application file for complete search history.

(56) References Cited

U.S. PATENT DOCUMENTS 6,317,555 B1 * 11/2001 Maron .................. G01L 9/0039
385/136
2004/0218867 A1 11/2004 Nakamura et al.
(Continued)

FOREIGN PATENT DOCUMENTS

JP 2001-013363 A 1/2001
JP 2004-020754 A 1/2004
(Continued)

*Primary Examiner* — Omar R Rojas
(74) *Attorney, Agent, or Firm* — Carrier Blackman & Associates, P.C.; Joseph P. Carrier; Anne G. Sabourin

(57) ABSTRACT

There are provided an optical receptacle having an optical fiber including a first portion on another end surface side, a third portion on one end surface side, and a second portion between the first portion and the third portion; a core diameter at the first portion is smaller than the core diameter at the third portion; the core diameter at the second portion increases from the first portion side toward the third portion side; a first elastic member is provided between the optical fiber and an inner wall of a through-hole; a holder holds the another end surface side of a fiber stub; and the sleeve holds the one end surface side of the fiber stub.

20 Claims, 23 Drawing Sheets

Related U.S. Application Data continuation of application No. PCT/JP2017/024011, filed on Jun. 29, 2017.

(51) Int. Cl.
  *G02B 6/02* (2006.01)
  *G02B 6/26* (2006.01)

(56) References Cited

U.S. PATENT DOCUMENTS

| | | |
|---|---|---|
| 2014/0254989 A1 | 9/2014 | Takahashi et al. |
| 2016/0131850 A1 | 5/2016 | Kondo et al. |
| 2016/0154187 A1 | 6/2016 | Kondo et al. |
| 2016/0164612 A1 | 6/2016 | Wilks et al. |
| 2016/0341899 A1 | 11/2016 | Yokoyama |
| 2017/0293072 A1 | 10/2017 | Kondo et al. |

FOREIGN PATENT DOCUMENTS

| | | | |
|---|---|---|---|
| JP | 2004-205654 | A | 7/2004 |
| JP | 2004-354809 | A | 12/2004 |
| JP | 2005-037570 | A | 2/2005 |
| JP | 2005-208113 | A | 8/2005 |
| JP | 2005-284150 | A | 10/2005 |
| JP | 2005-300596 | A | 10/2005 |
| JP | 2006-119633 | A | 5/2006 |
| JP | 2006-154243 | A | 6/2006 |
| JP | 2008-299029 | A | 12/2008 |
| JP | 2013-114001 | A | 6/2013 |
| JP | 2015-028593 | A | 2/2015 |
| JP | 2015-038592 | A | 2/2015 |
| JP | 2016-128900 | A | 7/2016 |

\* cited by examiner

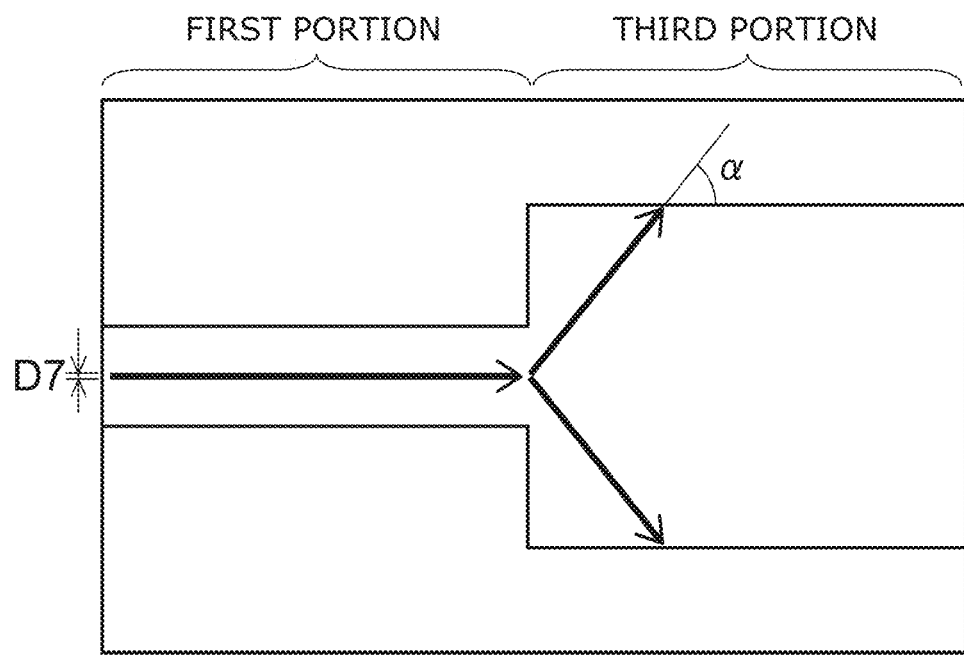
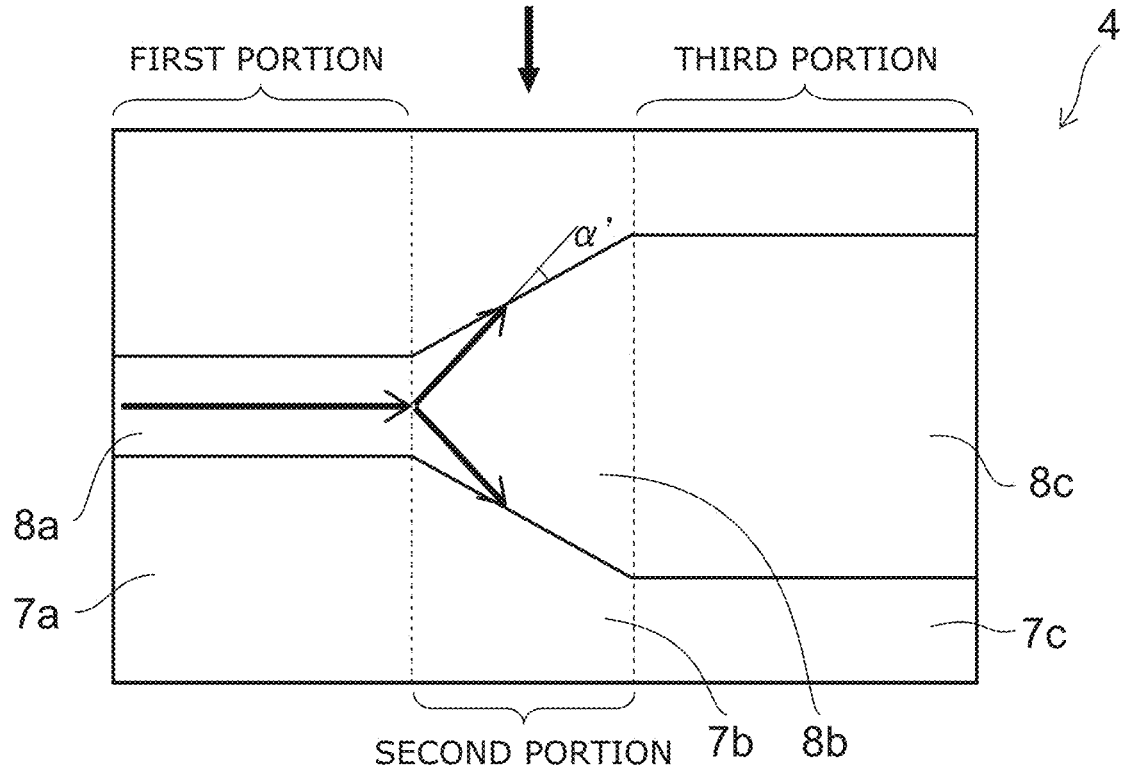
FIG. 4

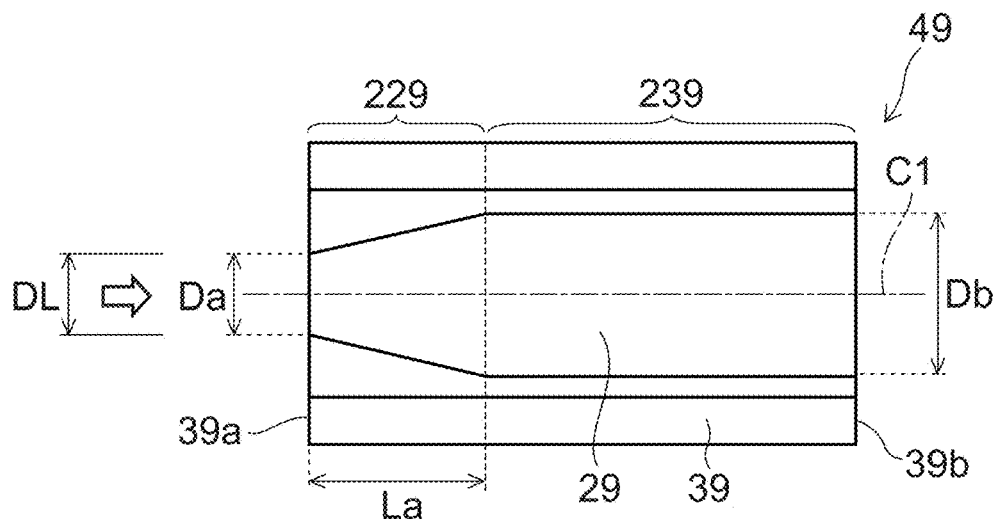
FIG. 15A
| LENGTH OF CONVERSION PORTION LOST BY POLISHING (%) | LOSS (dB) |
|---|---|
| 0 | −1.06 |
| 20 | −1.11 |
| 40 | −1.89 |
| 60 | −3.93 |
| 80 | −4.45 |
FIG. 15B
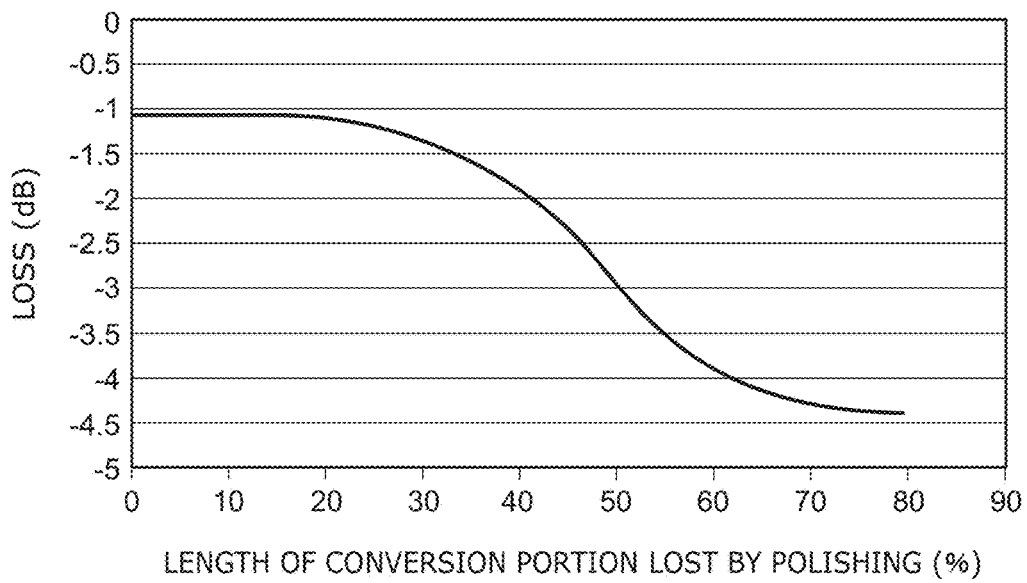
FIG. 15C

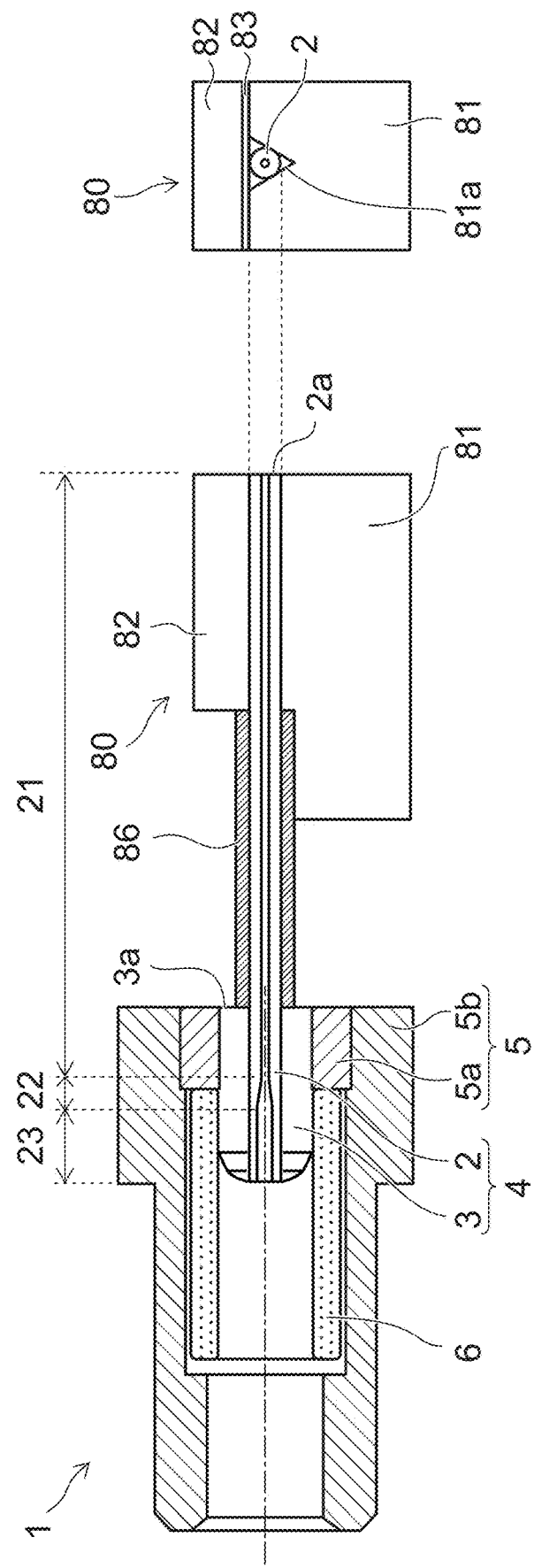

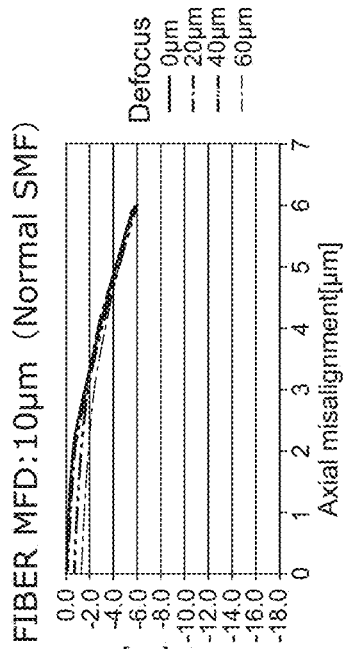
FIG. 27C
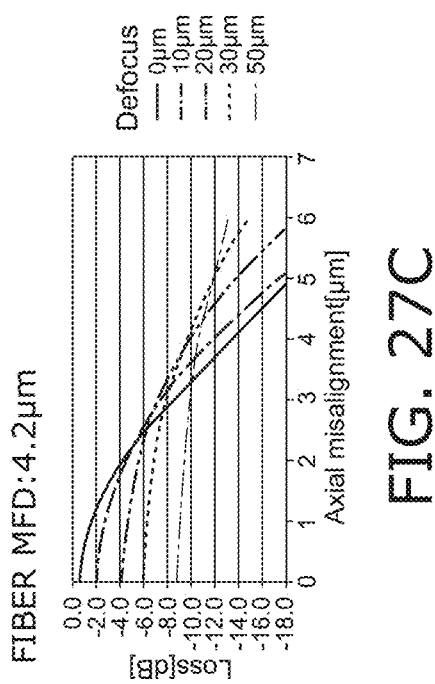
FIG. 27B
FIG. 27E
FIG. 27D
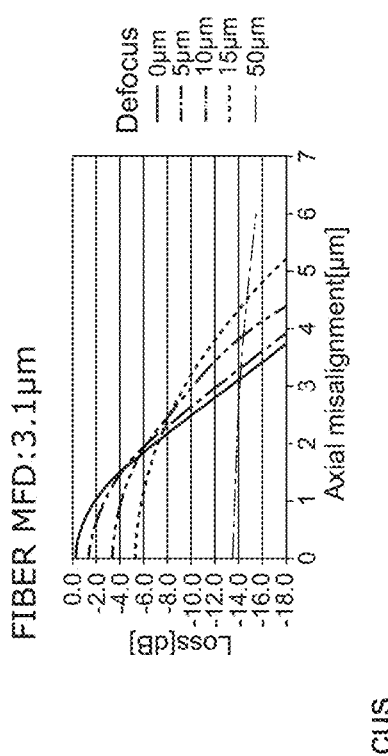
FIG. 27A

OPTICAL RECEPTACLE AND OPTICAL TRANSCEIVER

CROSS-REFERENCE TO RELATED APPLICATIONS

This is a continuation application of co-pending U.S. application Ser. No. 16/234,877, filed Dec. 28, 2018, which is a continuation application of International Application PCT/JP2017/024011, filed on Jun. 29, 2017. This application also claims priority to Japanese Application No. 2016-129047, filed on Jun. 29, 2016, and Japanese Application No. 2017-127001, filed on Jun. 29, 2017; the entire contents of each are incorporated herein by reference.

FIELD

Embodiments of the invention relate generally to an optical transceiver and a module for an optical communication, and specifically relate to an optical receptacle suitable for high speed communication module.

BACKGROUND

An optical receptacle is used as a part for optically connecting an optical fiber connector to an optical element such as a light receiving element, a light-emitting element, or the like in an optical module of an optical communication transceiver.

In recent years, faster optical communication transceivers are necessary as IP traffic increases. Generally, the configurations of transceivers and the like employing receptacle-type optical modules are standardized; the space that is necessary for electrical circuits increases as the modulation rate of an optical signal emitted from a semiconductor laser which is one optical element is becoming faster; and it is desirable to downsize the optical modules.

The mode field diameter of a semiconductor laser element is smaller than the core diameter of 10 μm of an optical fiber generally used as the transmission line of an optical signal.

In recent years, to provide a faster communication speed of optical transceivers, a structure of an optical module is being used in which multiple semiconductor lasers are included inside a single module; and the light that is emitted from each of the semiconductor lasers is multiplexed in one waveguide inside an optical waveguide formed in the interior of a plate member and subsequently optically coupled to an optical fiber of an optical receptacle. To downsize these optical modules, it is necessary to downsize the plate member including the optical waveguide described above; and there is a tendency for the core diameter of the optical waveguide to be small.

Also, in an optical module in which a light receiving element is used instead of a light-emitting element, there is a tendency for the light-receiving diameter of the light receiving element to be small in order to be used in faster and longer-distance communication applications.

The lens for condensing the light emitted from the semiconductor laser element into the fiber core or for condensing the light emitted from the fiber core into the light receiving element must have a magnification function in the case where there is a difference between the fiber core diameter and the mode field diameter of the optical element; however, as the difference increases, the focal length of the lens lengthens or the necessary number of lenses increases; and it is problematic in that the optical system is complex and expensive.

To prevent the lengthening of the module total length or the higher complexity of the optical system, a method is known in which the magnification due to the lens is suppressed to be small; instead, a lens is formed in the fiber tip which is a portion of the optical element-side end surface of the optical fiber; or a GI fiber is fused to enlarge the mode field diameter of the incident light to cause a mode field diameter that is optimal for the fiber to be incident on the fiber end surface (e.g., JP 2006-154243 A (Kokai).

However, the method of JP 2006-154243 A (Kokai) uses a GI fiber in which the mode field diameter changes periodically; therefore, to obtain the optimal mode field diameter, the length of the GI fiber must be controlled strictly; and it is problematic in that the control is difficult when manufacturing.

Also, when fusing a fiber such as a GI fiber in which the refractive index is different in steps in the diametrical direction from the core center to the outer perimeter portion, for fusion technology of forming one body by melting the fiber end surfaces, the cores that have different refractive indexes undesirably melt and mix together; therefore, it is difficult to control the refractive index of the fused portion periphery; and it is problematic in that the optical loss is undesirably large.

Also, in JP 2006-119633 A (Kokai), an optical receptacle is proposed in which the optical element side of the optical fiber is formed in a tapered configuration; and the mode field diameter on the optical element side is set to be smaller than the mode field diameter on the PC (Physical Contact) side. Thereby, the connection loss can be suppressed. However, in the configuration of JP 2006-119633 A (Kokai), the tapered configuration is positioned at the end portion on the optical element side. Mirror (polishing) finishing of the two end portions of the optical fiber is necessary not to harm the light incidence and emission. Therefore, according to the condition of the mirror finishing, the diameter undesirably changes; and it is problematic in that it is difficult to stably control the mode field diameter. In other words, in the configuration of JP 2006-119633 A (Kokai) as well, a high-precision dimensional tolerance is necessary for the axis-direction length of the optical fiber.

Embodiments of the invention are implemented to solve the problems recited above, and are directed to provide an optical receptacle and an optical transceiver in which the conversion efficiency of the mode field is suppressed by forming a portion where the refractive index and the core diameter transition gradually in a fused portion between a fiber generally used as a transmission line and a fiber having a larger refractive index difference between the core and the cladding than the fiber generally used as the transmission line while contributing to shortening the optical module total length by setting the core at the optical element-side end surface of the optical fiber to be small and by fusing the fiber having the large refractive index difference between the core and the cladding; and as a result, the decrease of the coupling efficiency from the optical element to the plug ferrule can be suppressed.

SUMMARY

According to an embodiment of the invention, one embodiment is an optical receptacle that includes a fiber stub, a holder, and a sleeve; the fiber stub includes an optical fiber, a ferrule, and a first elastic member; the optical fiber includes cladding and a core for transmitting light; the ferrule has a through-hole where the optical fiber is fixed; the first elastic member fixes the optical fiber in the through-hole; the holder holds the fiber stub; the sleeve is configured to hold the fiber stub at one end and hold a plug ferrule at another end; the fiber stub has one end surface and another end surface; the one end surface is on a side of the ferrule optically connected to the plug ferrule; the other end surface is on a side opposite to the one end surface; the optical fiber includes a first portion on the other end surface side, a third portion on the one end surface side, and a second portion between the first portion and the third portion; a core diameter at the first portion is smaller than the core diameter at the third portion; the core diameter at the second portion increases from the first portion side toward the third portion side; the first elastic member is provided between the optical fiber and an inner wall of the through-hole; the holder holds the other end surface side of the fiber stub; and the sleeve holds the one end surface side of the fiber stub.

BRIEF DESCRIPTION OF THE DRAWINGS

FIG. 4 is a schematic view of beam propagation of the first embodiment of the invention;

FIG. 15A to FIG. 15C are schematic views illustrating an example of an analysis regarding a length of the first portion;

FIG. 26A and FIG. 26B are schematic cross-sectional views illustrating an optical receptacle according to a seventh embodiment of the invention;

FIG. 27A to FIG. 27E are descriptive views illustrating examples of analysis results of the optical receptacle according to the seventh embodiment of the invention;

DETAILED DESCRIPTION

Figure 1:
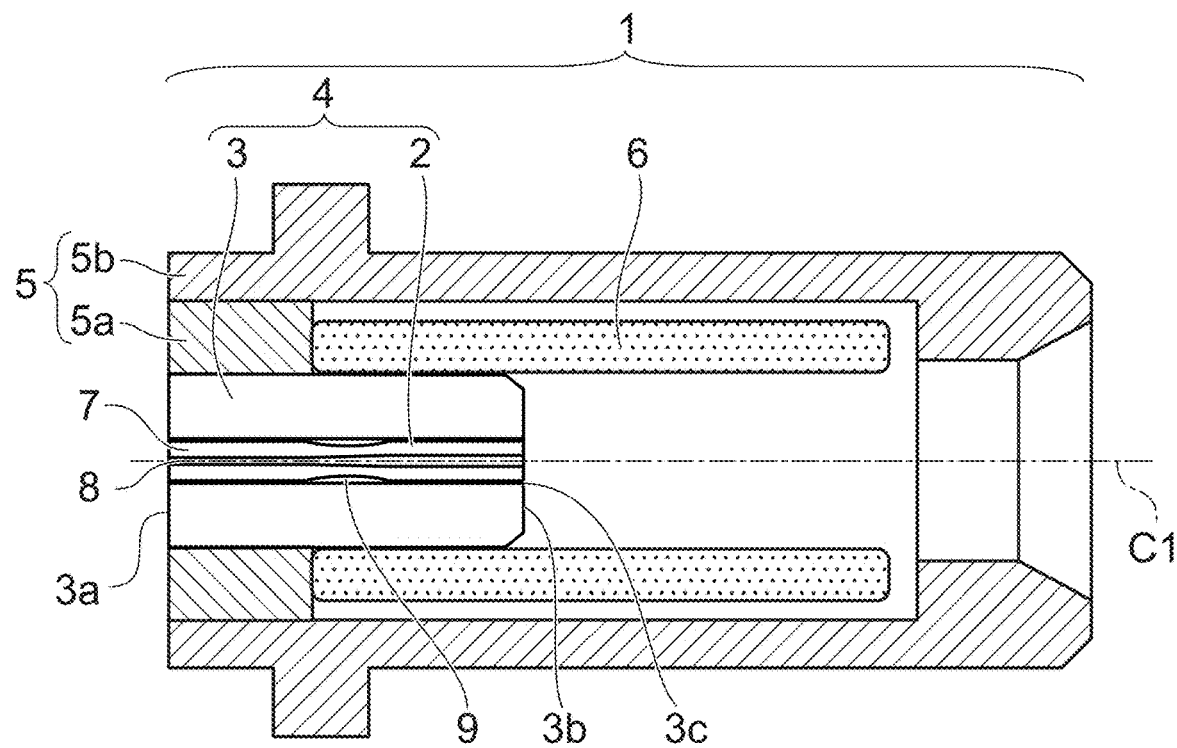
FIG. 1 is a schematic cross-sectional view of an optical receptacle showing a first embodiment of the invention.

A first invention is an optical receptacle that includes a fiber stub, a holder, and a sleeve; the fiber stub includes an optical fiber, a ferrule, and a first elastic member; the optical fiber includes cladding and a core for transmitting light; the ferrule has a through-hole where the optical fiber is fixed; the first elastic member fixes the optical fiber in the through-hole; the holder holds the fiber stub; the sleeve is configured to hold the fiber stub at one end and hold a plug ferrule at another end; the fiber stub has one end surface and another end surface; the one end surface is on a side of the ferrule optically connected to the plug ferrule; the other end surface is on a side opposite to the one end surface; the optical fiber includes a first portion on the other end surface side, a third portion on the one end surface side, and a second portion between the first portion and the third portion; a core diameter at the first portion is smaller than the core diameter at the third portion; the core diameter at the second portion increases from the first portion side toward the third portion side; the first elastic member is provided between the optical fiber and an inner wall of the through-hole; the holder holds the other end surface side of the fiber stub; and the sleeve holds the one end surface side of the fiber stub.

According to the optical receptacle, the length of the optical module can be reduced because the core diameter at the end surface of the ferrule on the side opposite to the side optically connected to the plug ferrule is smaller than the core diameter at the end surface of the ferrule on the side optically connected to the plug ferrule.

Also, by forming the second portion, the optical loss at the second portion can be suppressed because an abrupt change of the core shape when transitioning from the first portion to the third portion can be suppressed.

Further, it is not a problem for the second portion to be located at any optical ferrule inner diameter portion because the configurations of the first portion and the third portion do not change in the axis direction and the loss of the light is small. Thereby, precise length control of the fiber is unnecessary; and the receptacle can be manufactured economically.

Also, the optical receptacle is connected to an optical fiber that is generally laid. The MFD of the optical fiber that is generally laid is about 10 μm; and the connection loss due to the MFD difference between the plug and the optical receptacle can be suppressed by disposing the third portion on the optical connection side.

A second invention is the optical receptacle of the first invention, wherein a refractive index of the core at the first portion, the refractive index of the core at the second portion, and the refractive index of the core at the third portion are equal to each other; a refractive index of the cladding at the first portion is smaller than the refractive index of the cladding at the third portion; and the refractive index of the cladding at the second portion increases from the first portion side toward the third portion side.

According to the optical receptacle, by using a fiber having a large refractive index difference, even in the case of a small core diameter, the light can be confined without scattering; and the loss when the light is incident on the fiber can be suppressed. Also, by forming the second portion, the optical loss at the second portion can be suppressed because an abrupt change of the refractive index difference when transitioning from the first portion to the third portion can be suppressed. Also, the raw material of the core can be used commonly; a refractive index difference between the cores does not exist at the connection portions of the first portion, the second portion, and the third portion; therefore, the loss due to reflections at the connection portions can be suppressed.

A third invention is the optical receptacle of the first invention, wherein a refractive index of the cladding at the first portion, the refractive index of the cladding at the second portion, and the refractive index of the cladding at the third portion are equal to each other; a refractive index of the core at the first portion is larger than the refractive index of the core at the third portion; and the refractive index of the core at the second portion decreases from the first portion side toward the third portion side.

According to the optical receptacle, the cladding can have uniform properties because each cladding can be formed of the same raw material. Thereby, the formation of the cladding outer diameter can be performed easily when fusing because the melting points also are uniform.

A fourth invention is the optical receptacle of the first invention, wherein the core diameter at the second portion increases linearly from the first portion side toward the third portion side.

According to the optical receptacle, even if the laser entering the second portion spreads in a radial configuration, the laser is incident at a small angle at the boundary between the cladding and the core; and the light can be prevented from escaping to the cladding side by total internal reflection of the light.

A fifth invention is the optical receptacle of the first invention, wherein the core diameter at the second portion increases nonlinearly from the first portion side toward the third portion side.

According to the optical receptacle, the manufacturing can be performed relatively easily because a high-precision control is unnecessary for the fused fiber tensile speed and the fusion discharge time and power when forming the second portion.

A sixth invention is the optical receptacle of the first invention, wherein the core at the second portion includes a level difference at a portion of a region where the core diameter at the second portion increases from the first portion side to the third portion side.

According to the optical receptacle, the manufacturing can be performed relatively easily because a high-precision control is unnecessary for the fused fiber tensile speed and the fusion discharge time and power when forming the second portion. Also, by using this configuration, the choices of the fibers used in the fusing can be greater because even fibers that have different melting points can be connected.

A seventh invention is the optical receptacle of the first invention, wherein the core diameter at the first portion is not less than 0.5 μm and not more than 8 μm.

According to the optical receptacle, by setting the MFD of the fiber side to be small for the light emitted from a fine optical waveguide, it is no longer necessary to provide a zoom for the light when the light is incident on the fiber. Thereby, a reduction of the coupling distance is realized; and this also can contribute to simplifying the lens.

An eighth invention is the optical receptacle of the first invention, where a difference between a refractive index of the core and a refractive index of the cladding at the first portion is larger than a difference between the refractive index of the core and the refractive index of the cladding at the third portion.

According to the optical receptacle, in the case where light having a beam waist smaller than the third portion is transmitted in the first portion, the light can propagate with a single mode and with low loss.

A ninth invention is the optical receptacle of the first invention, wherein a difference between a refractive index of the core and a refractive index of the cladding at the first portion is larger than a difference between the refractive index of the core and the refractive index of the cladding at the second portion.

According to the optical receptacle, in the case where light having a beam waist smaller than the second portion is transmitted in the first portion, the light can propagate with a single mode and with low loss.

A tenth invention is the optical receptacle of the first invention, wherein the core diameter at the third portion is not less than 8 μm and not more than 20 μm.

According to the optical receptacle, the MFD can be matched to an optical communication single-mode fiber generally used currently; therefore, the coupling loss caused by the MFD difference when coupling to the plug ferrule can be suppressed.

An eleventh invention is the optical receptacle of the first invention, wherein a difference between a refractive index of a core and a refractive index of cladding at the third portion is smaller than a difference between the refractive index of the core and the refractive index of the cladding at the second portion.

According to the optical receptacle, in the case where light having a beam waist larger than the second portion is transmitted in the third portion, the light can propagate with a single mode and with low loss.

A twelfth invention is the optical receptacle of the first invention, wherein a difference between a refractive index of the core and a refractive index of the cladding at the second portion decreases from the first portion side toward the third portion side.

According to the optical receptacle, the refractive index decreases gradually from the first portion side toward the third portion side; therefore, an abrupt refractive index change between the first portion and the third portion can be prevented; and the optical loss due reflections and/or scattering at the coupling position between the first portion and the third portion can be suppressed.

A thirteenth invention is the optical receptacle of the first invention, wherein an outer diameter of the optical fiber at the first portion is equal to the outer diameter of the optical fiber at the third portion.

According to the optical receptacle, by setting the exterior forms of the first portion and the third portion to be equal, the central axis misalignment between the first portion and the third portion can be prevented; and the fusion loss caused by axial misalignment can be suppressed.

A fourteenth invention is the optical receptacle of the first invention, wherein an outer diameter of the optical fiber at the second portion is smaller than the outer diameter of the optical fiber at the first portion.

According to the optical receptacle, the first elastic member exists in a wedge-like configuration at the outer perimeter of the second portion where the outer diameter of the optical fiber becomes finer; therefore, a protrusion of the optical fiber outside the ferrule is suppressed; and chipping and/or cracks of the outer perimeter of the optical fiber can be suppressed.

A fifteenth invention is the optical receptacle of the first invention, wherein an outer diameter of the optical fiber at the second portion is smaller than the outer diameter of the optical fiber at the third portion.

According to the optical receptacle, by providing the cladding outer diameter difference between the second portion and the third portion, the wedge effect due to the first elastic member provided on the outer side of the cladding of the second portion can be more effective.

A sixteenth invention is the optical receptacle of the first invention, wherein an axis-direction central portion of the second portion is disposed not to overlap a region where the ferrule and the holder are in contact According to the optical receptacle, for example, even in the case where the second portion is formed by fusing, the undesirable occurrence of fiber breakage or the like at the second portion due to stress applied to the second portion which has a lower relative strength than the first portion and the third portion can be suppressed. The reliability of the optical receptacle can be increased further.

A seventeenth invention is the optical receptacle of the first invention, wherein the first portion, the second portion, and the third portion are disposed inside the through-hole over the entire regions of the first portion, the second portion, and the third portion.

According to the optical receptacle, discrepancies such as breaking and/or cracks of the optical fiber due to an external force can be suppressed because the entire optical fiber exists inside the through-hole of the ferrule.

An eighteenth invention is the optical receptacle of the first invention that further includes a transparent member fixed to the ferrule; the through-hole includes a small diameter portion and a large diameter portion; the large diameter portion is provided on the other end surface side and has a diameter larger than a diameter of the small diameter portion; the entire optical fiber is disposed in the small diameter portion; at least a portion of the transparent member is disposed in the large diameter portion; and the first elastic member is provided between the optical fiber and the transparent member.

According to the optical receptacle, by providing the third portion, the undesirable extension of the optical connection distance due to the beam diameter conversion typified by a zoom lens or the like when the light is incident on the fiber from the optical member such as the fine waveguide or the like can be suppressed; and by providing the large diameter portion in the ferrule, the incident surface can be disposed further inside the receptacle interior; and the optical connection distance from the plug connection surface of the optical receptacle to the waveguide can be shorter.

A nineteenth invention is the optical receptacle of the first invention, wherein the first portion includes a portion protruding from the ferrule; and the second portion and the third portion are disposed inside the through-hole over the entire regions of the second portion and the third portion.

According to the optical receptacle, by setting the optical fiber to protrude from the ferrule end surface, the alignment is easy when optically connecting the optical element and the optical receptacle.

A twentieth invention is the optical receptacle of the nineteenth invention, wherein the through-hole of the ferrule includes a first region and a second region; a width in an orthogonal direction of the first region corresponds to a width in the orthogonal direction of the optical fiber; the orthogonal direction is orthogonal to an axis direction of the through-hole; the second region is disposed on the other end surface side of the first region and has a width in the orthogonal direction widening toward the other end surface; and an axis-direction central portion of the second portion is disposed to overlap the first region.

According to the optical receptacle, the application of external stress to the second portion can be suppressed by disposing the axis-direction central portion of the second portion to overlap the first region. Thereby, the occurrence of fiber damage, etc., at the second portion can be suppressed.

A twenty-first invention is the optical receptacle of the nineteenth invention, wherein the through-hole of the ferrule includes a first region and a second region; a width in an orthogonal direction of the first region corresponds to a width in the orthogonal direction of the optical fiber; the orthogonal direction is orthogonal to an axis direction of the through-hole; the second region is disposed on the other end surface side of the first region and has a width in the orthogonal direction widening toward the other end surface; and the second portion is disposed to overlap the first region.

According to the optical receptacle, the application of external stress to the second portion can be suppressed by disposing the second portion to overlap the first region. Thereby, the occurrence of fiber damage, etc., at the second portion can be suppressed.

The twenty-second invention is the optical receptacle of the nineteenth invention that further includes a fixing member provided on an end surface side of the portion of the first portion protruding from the ferrule; the fixing member fixes the optical fiber; and the fixing member is disposed to be separated from the ferrule.

According to the optical receptacle, by providing the fixing member, the position of the optical fiber can be controlled with high precision even in the case where a portion of the optical fiber protrudes from the ferrule. For example, the alignment with the optical element can be performed with high precision in a short length of time.

A twenty-third invention is the optical receptacle of the twentieth invention, wherein the holder holds a portion of an outer side surface of the ferrule on the other end surface side of the first region.

According to the optical receptacle, the undesirable application of external stress to the second portion due to the press-fitting of the ferrule into the holder can be suppressed further.

A twenty-fourth invention is the optical receptacle of the nineteenth invention, wherein the holder does not protrude from the other end surface.

According to the optical receptacle, the holder can have a simple configuration; and the member cost of the holder can be suppressed. Also, undesirable contact of the optical fiber with the holder when bending the optical fiber also can be suppressed.

A twenty-fifth invention is the optical receptacle of the twentieth invention, wherein the holder holds only a portion of an outer side surface of the ferrule opposing the first region.

According to the optical receptacle, the member cost of the holder can be suppressed; and the undesirable contact of the optical fiber with the holder can be suppressed. Further, the stress that is applied to the boundary portion between the first region and the second region can be relaxed.

A twenty-sixth invention is the optical receptacle of the nineteenth invention that further includes a protective member and a tube; the protective member covers a portion of the optical fiber extending outside the ferrule; the tube covers the protective member; and a space is provided between the protective member and the tube.

According to the optical receptacle, the undesirable direct contact of the protective member with the holder can be suppressed. Also, for bending as well, stress concentration occurs at the interface between the tube and the first elastic member; but the propagation of cracks can be suppressed because the space exists between the tube and the protective member. Also, because the tube exists independently of the optical fiber, the selection of the materials according to the optical characteristics of the optical fiber, etc., are not limited; and a bending resistance that is stronger than that of the protective member can be realized by selecting a material that is stronger than the protective member.

A twenty-seventh invention is the optical receptacle of the nineteenth invention that further includes a second elastic member covering the first elastic member at a portion of the optical fiber extending outside the ferrule; and a hardness of the second elastic member is lower than a hardness of the first elastic member.

According to the optical receptacle, when bending acts on the optical fiber at the end portion of the holder, stress relief can be realized for the optical properties of the optical fiber and the ferrule; and the characteristics of the two can be realized.

A twenty-eighth invention is the optical receptacle of the first invention, wherein at an end surface of the fiber stub on the side opposite to the side optically connected to the plug ferrule, a portion of an end surface of the ferrule and an end surface of the optical fiber have a prescribed angle from a plane perpendicular to a central axis of the fiber stub.

According to the optical receptacle, by polishing the portion of the end surface of the ferrule and the end surface of the optical fiber to have the prescribed angle from the plane perpendicular to the central axis of the fiber stub, the light that is emitted from the light-emitting element connected to the optical receptacle, is incident on the optical fiber, and is reflected by the end surface of the optical fiber is prevented from returning to the light-emitting element; and the optical element can be operated stably.

A twenty-ninth invention is the optical receptacle of the first invention, wherein the first portion, the second portion, and the third portion are formed as one body.

According to the optical receptacle, by forming the optical fiber as one body, the optical loss can be suppressed by preventing the occurrence of gaps at the boundaries between the first portion, the second portion, and the third portion.

A thirtieth invention is an optical receptacle of the first invention, wherein a length of the first portion along a central axis of the fiber stub is 5 μm or more.

According to the optical receptacle, the optical loss that is caused by fluctuation of the polishing and the length of the optical fiber can be suppressed.

A thirty-first invention is the optical receptacle of the first invention, wherein a length of the third portion along a central axis of the fiber stub is 5 μm or more.

According to the optical receptacle, the optical loss that is caused by the fluctuation of the polishing and the length of the optical fiber can be suppressed.

A thirty-second invention is the optical receptacle of the first invention, wherein the optical fiber includes, at the second portion, a finest portion where an outer diameter is smallest; a change of an inner diameter of the through-hole is smaller than a change of the outer diameter of the optical fiber; a thickness of the first elastic member is largest at the finest portion, increases gradually from the first portion toward the finest portion, and increases gradually from the third portion toward the finest portion; and in an axis direction of the optical fiber, the length of the first elastic member provided between the second portion and the inner wall is shorter than at least one of the length in the axis direction of the first elastic member provided between the first portion and the inner wall or the length in the axis direction of the first elastic member provided between the third portion and the inner wall.

According to the optical receptacle, the first elastic member that is provided at the finest portion where the outer diameter of the optical fiber is smallest exists in a wedge-like configuration; and movement of the optical fiber in the axis direction can be suppressed. For example, the protrusion of the optical fiber outside the ferrule can be suppressed; and chipping and/or cracks of the outer perimeter of the optical fiber can be suppressed. The tip of the optical fiber is further inward than the tip of the ferrule; and the undesirable increase of the optical loss when coupling to the plug ferrule can be suppressed.

A thirty-third invention is the optical receptacle of the first invention, wherein an eccentricity of a center of the core at the other end surface is 7 μm or less when a center of an outer diameter of the ferrule is used as a reference.

According to the optical receptacle, when performing an alignment operation with an optical element such as a semiconductor laser element or the like, at least a portion of the light irradiated from the optical element can be incident on the core by merely mounting the optical receptacle and the optical element at initial positions; and the alignment operation can be easy.

A thirty-fourth invention is the optical receptacle of the first invention, wherein in a direction orthogonal to an axis direction of the optical fiber, a displacement amount between the cladding at the first portion and the cladding at the third portion is 4 μm or less.

According to the optical receptacle, the undesirable occurrence of axial misalignment with the plug ferrule on the one end surface side connected optically to the plug ferrule can be suppressed. An increase of the connection loss due to axial misalignment with the plug ferrule can be suppressed.

A thirty-fifth invention is an optical transceiver that includes the first optical receptacle.

According to the optical transceiver, the conversion efficiency of the mode field is suppressed by forming a portion where the refractive index and the core diameter transition gradually in a fused portion between a fiber generally used as a transmission line and a fiber having a larger refractive index difference between the core and the cladding than the fiber generally used as the transmission line while contributing to shortening the optical module total length by setting the core at the optical element-side end surface of the optical fiber to be small and by fusing the fiber having the large refractive index difference between the core and the cladding; and as a result, the decrease of the coupling efficiency from the optical element to the plug ferrule can be suppressed.

An optical receptacle and an optical transceiver are provided in which the core at the optical element-side end surface of the optical fiber is set to be small; thereby, a high-precision dimensional tolerance is unnecessary for the axis-direction length of the fiber, and the decrease of the coupling efficiency is prevented by suppressing the movement of the fiber in the axis direction while contributing to the shortening of the optical module total length; and the loss of the MFD conversion can be suppressed.

Embodiments of the invention will now be illustrated with reference to the drawings. Similar components in the drawings are marked with the same reference numerals; and a detailed description is omitted as appropriate.

FIRST EMBODIMENT

FIG. 1 is a schematic cross-sectional view of an optical receptacle showing a first embodiment of the invention.

The optical receptacle 1 includes a fiber stub 4, a holder 5 holding the fiber stub 4, and a sleeve 6 configured to hold the tip of the fiber stub 4 at one end and holding a plug ferrule inserted into the optical receptacle 1 at the other end. The fiber stub 4 includes an optical fiber 2, a ferrule 3 having a through-hole 3c where the optical fiber 2 is held, and an elastic member 9 (a first elastic member). The elastic member 9 is provided between the optical fiber 2 and the inner wall of the through-hole 3c. The optical fiber 2 is fixedly bonded in the through-hole 3c of the ferrule 3 using the elastic member 9. The plug ferrule that is inserted into the optical receptacle 1 is not illustrated.

The holder 5 includes a bush 5a and a housing 5b. The bush 5a engages the outer side surface of the ferrule 3 and holds the rear end side of the ferrule 3. The housing 5b engages the outer side surface of the bush 5a and covers the fiber stub 4 and the sleeve 6. The housing 5b covers the fiber stub 4 and the sleeve 6 around the axis and protects the fiber stub 4 and the sleeve 6 from an external force, etc. Thus, the bush 5a holds the fiber stub 4 and the sleeve 6 in a state of being housed inside the housing 5b. For example, the housing 5b has a cylindrical configuration. The outer diameter of the bush 5a is larger than the outer diameter of the sleeve 6. The inner diameter of the housing 5b is substantially the same as the outer diameter of the bush 5a. The housing 5b engages only the outer side surface of the bush 5a without engaging the outer side surface of the sleeve 6.

Although a ceramic, glass, etc., are examples of materials suited to the ferrule 3, a zirconia ceramic is used in the example; the optical fiber 2 is fixedly bonded at the center of the zirconia ceramic; and one end (an end surface 3b: referring to FIG. 1) optically connected to the plug ferrule is formed by polishing into a convex spherical surface. Also, it is common for the fiber stub 4 to be fixed by press-fitting into the holder 5 (the bush 5a) in the assembly of the optical receptacle 1.

Although a resin, a metal, a ceramic, etc., are examples of materials suited to the sleeve 6, a split sleeve that is made of a zirconia ceramic and has a slit in the total length direction is used in the example. The sleeve 6 holds the tip portion (the end surface 3b) of the fiber stub 4 polished into a convex spherical surface at one end, and holds the plug ferrule inserted into the optical receptacle at the other end.

The optical fiber 2 includes a core 8 extending along a central axis C1, and cladding 7 surrounding the periphery of the core 8. For example, the refractive index of the core is higher than the refractive index of the cladding. For example, quartz glass is an example of the materials of the optical fiber (the core 8 and the cladding 7). An impurity may be added to the quartz glass.

The fiber stub 4 has one end surface (the end surface 3b) optically connected to the plug ferrule, and another end surface (an end surface 3a) on the side opposite to the one end surface. The core 8 is exposed from the cladding 7 at the end surface 3a and the end surface 3b.

For example, an optical element such as a semiconductor laser element or the like is disposed on the end surface 3a side. The light that is emitted from the semiconductor laser element or the like is incident on the optical receptacle 1 from the end surface 3a side and propagates through the core 8. Or, the light that is incident on the core 8 from the end surface 3b propagates through the core 8 and is emitted toward the optical element from the end surface 3a side.

An optical element such as an isolator or the like may be provided between the end surface 3a and the optical element such as the semiconductor laser element, etc. For example, the isolator includes a polarizer and/or an element (a Faraday element or the like) that rotates the polarization angle and transmits the light in only one direction. Thereby, for example, damage of the laser element, noise, etc., due to the returning light reflected by the end surface 3a can be suppressed.

Also, the fiber stub 4 may be polished so that the end surface 3b is tilted with respect to a plane orthogonal to the central axis C1. In other words, the end surface 3b that has a convex spherical configuration may be a convex spherical surface obliquely tilted with respect to the plane orthogonal to the central axis C1. Thereby, the optical receptacle 1 is connected optically to an APC (Angled Physical Contact) connector at the end surface 3b; and reflections and/or connection loss at the connection point can be suppressed.

Figure 2:
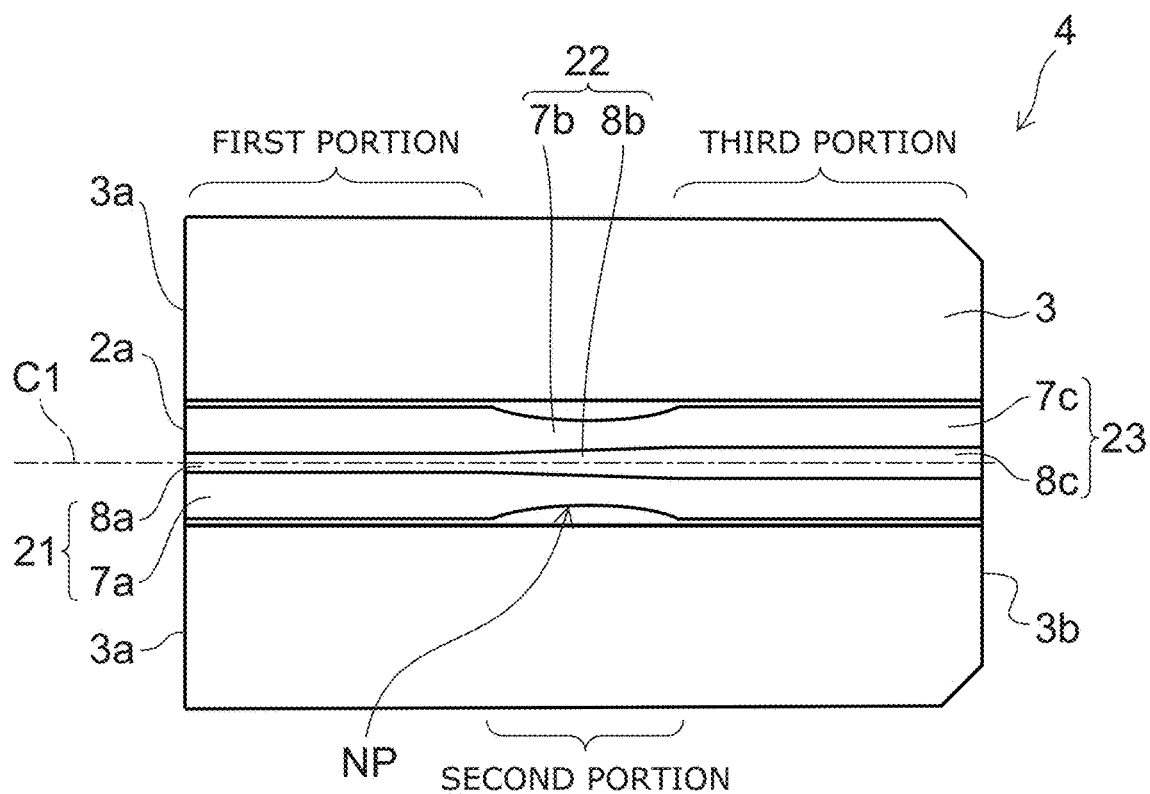
FIG. 2 is an enlarged cross-sectional view of the fiber stub of the first embodiment of the invention.

FIG. 2 is an enlarged cross-sectional view of the fiber stub of the first embodiment of the invention.

The optical fiber 2 is one fiber in which a first portion (a first portion 21), a second portion (a second portion 22), and a third portion (a third portion 23) are fused. The first portion of the optical fiber 2 is made of a first portion cladding 7a and a first portion core 8a; the second portion is made of second portion cladding 7b and a second portion core 8b; the third portion is made of third portion cladding 7c and a third portion core 8c; the third portion is disposed on the end surface 3b side of the fiber stub 4 polished into a convex spherical surface; the second portion is disposed in the center; and the first portion is disposed on the end surface 3a side optically connected to the optical element on the side opposite to the end surface 3b. The holder 5 (the bush 5a) holds the end surface 3a side (the first portion 21 side) of the fiber stub 4. The sleeve 6 holds the end surface 3b side (the third portion 23 side) of the fiber stub 4. The first portion cladding 7a, the second portion cladding 7b, and the third portion cladding 7c are included in the cladding 7 described in reference to FIG. 1. Also, the first portion core 8a, the second portion core 8b, and the third portion core 8c are included in the core 8 described in reference to FIG. 1.

Figure 3:
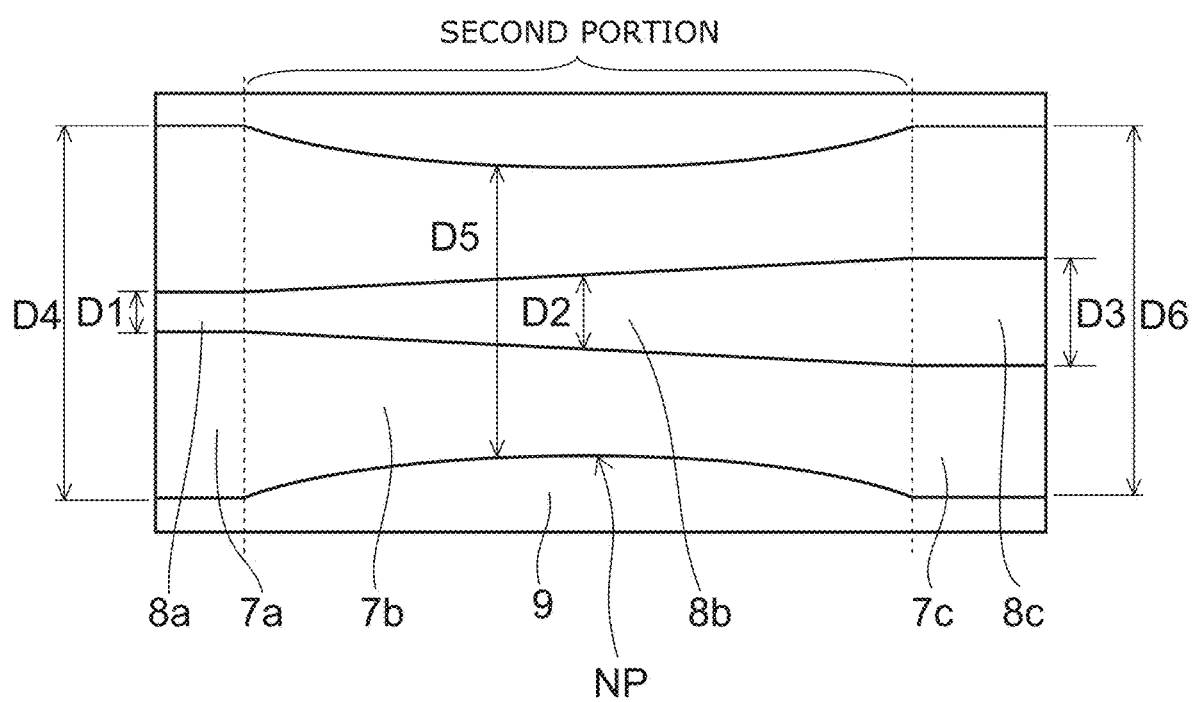
FIG. 3 is an enlarged cross-sectional view showing a state in which the second portion enlarges linearly of the first embodiment of the invention.

A core diameter D1 at the first portion is smaller than a core diameter D3 at the third portion; and a core diameter D2 at the second portion increases gradually as the core diameter D2 transitions from the first portion to the third portion (e.g., referring to FIG. 3). Also, a fiber outer diameter D4 of the first portion and a fiber outer diameter D6 of the third portion are the same size; but a fiber outer diameter D5 of the second portion is smaller than the fiber outer diameter D4 and the fiber outer diameter D6 (e.g., referring to FIG. 3). The core diameter is the length of the core along a direction orthogonal to the optical axis (the central axis C1), i.e., the diameter of the core. Also, the fiber outer diameter is the length of the fiber (the length of the cladding) along the direction orthogonal to the central axis C1, i.e., the diameter of the fiber.

Methods for forming the second portion include a method in which heat that is not less than the melting point of quartz is applied from the outer perimeter of the fused portion when fusing the first portion and the third portion while pulling the optical fiber fused portion, etc. It is necessary to design the length in the central axis C1-direction of the fiber stub 4 at the second portion by considering the length having the lowest loss and the limit of the length that can be elongated while applying heat. It is desirable for the length to be not less than 10 micrometers (μm) to 1000 μm.

Thus, the optical fiber 2 includes a finest portion NP at the second portion 22 where the outer diameter is smallest. The change of the inner diameter of the through-hole 3c is smaller than the change of the outer diameter of the optical fiber 2. The inner diameter of the through-hole 3c is substantially constant from the first portion 21 to the third portion 23. The thickness of the elastic member 9 is largest at the finest portion NP, increases gradually from the first portion 21 toward the finest portion NP, and increases gradually from the third portion 23 toward the finest portion NP. The length in the axis direction of the optical fiber 2 of the elastic member 9 provided between the second portion 22 and the inner wall 3c is shorter than at least one of the length in the axis direction of the elastic member 9 provided between the first portion 21 and the inner wall 3c or the length in the axis direction of the elastic member 9 provided between the third portion 23 and the inner wall 3c. In the example, the length of the elastic member 9 at the second portion 22 is shorter than both the length of the elastic member 9 at the first portion 21 and the length of the elastic member 9 at the third portion 23.

The configuration of the second portion is shown in FIG. 3, FIG. 4, FIG. 5, FIG. 6, and FIG. 7.

FIG. 3 shows a state in which the core diameter D2 at the second portion enlarges linearly as the core diameter D2 transitions from the first portion to the third portion. By providing this configuration, even if the laser entering the second portion spreads at a spread angle α, the laser is incident on the wall at a small angle α' as shown in FIG. 4; and the light is prevented from escaping to the cladding side. However, the speed of pulling the fiber and the electric discharge amount, the electric discharge timing, and the electric discharge position for applying the heat to the fiber must be controlled strictly to make this configuration; and the degree of difficulty of the configuration formation is relatively high.

Figure 5:
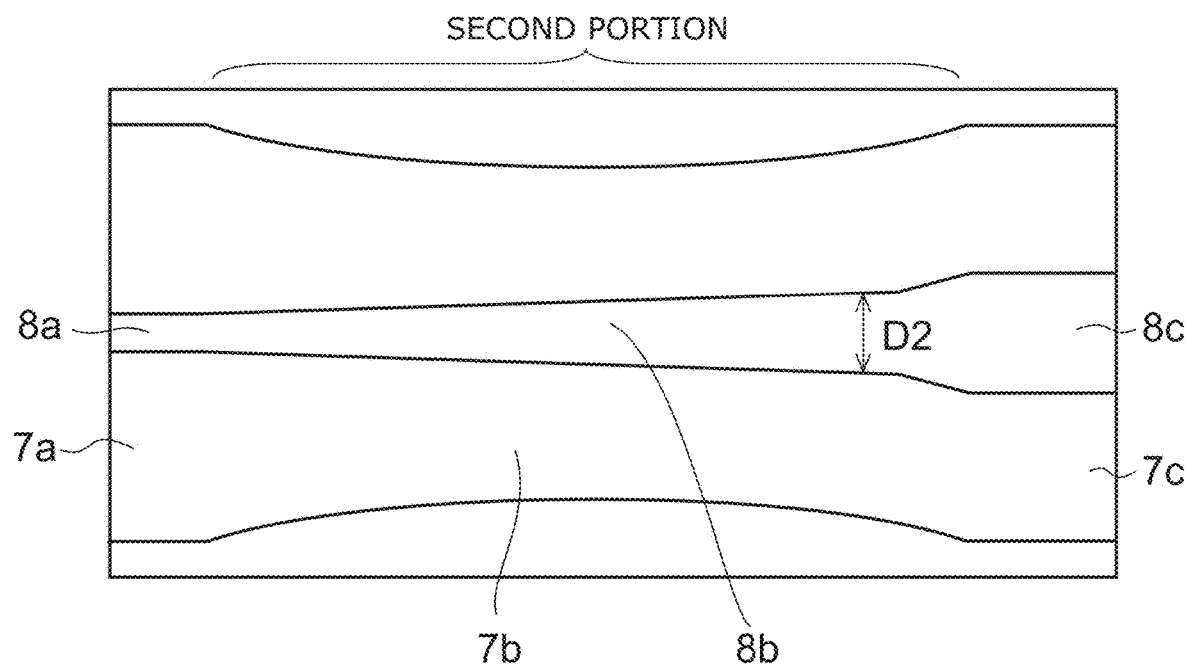
FIG. 5 is an enlarged cross-sectional view showing a state in which the second portion enlarges nonlinearly of the first embodiment of the invention.

FIG. 5 shows a state in which the core diameter D2 at the second portion enlarges nonlinearly as the core diameter D2 transitions from the first portion to the third portion. By providing this configuration, although there is a possibility that the loss at the conversion portion (the second portion) may be larger than when the core enlarges linearly, the tolerable values of the control items recited above are greater; therefore, even for manufacturing equipment in which the electric discharge amount and/or the electric discharge timing cannot be controlled, an advantage is provided in that this configuration can be made using a relatively simple control.

Figure 6:
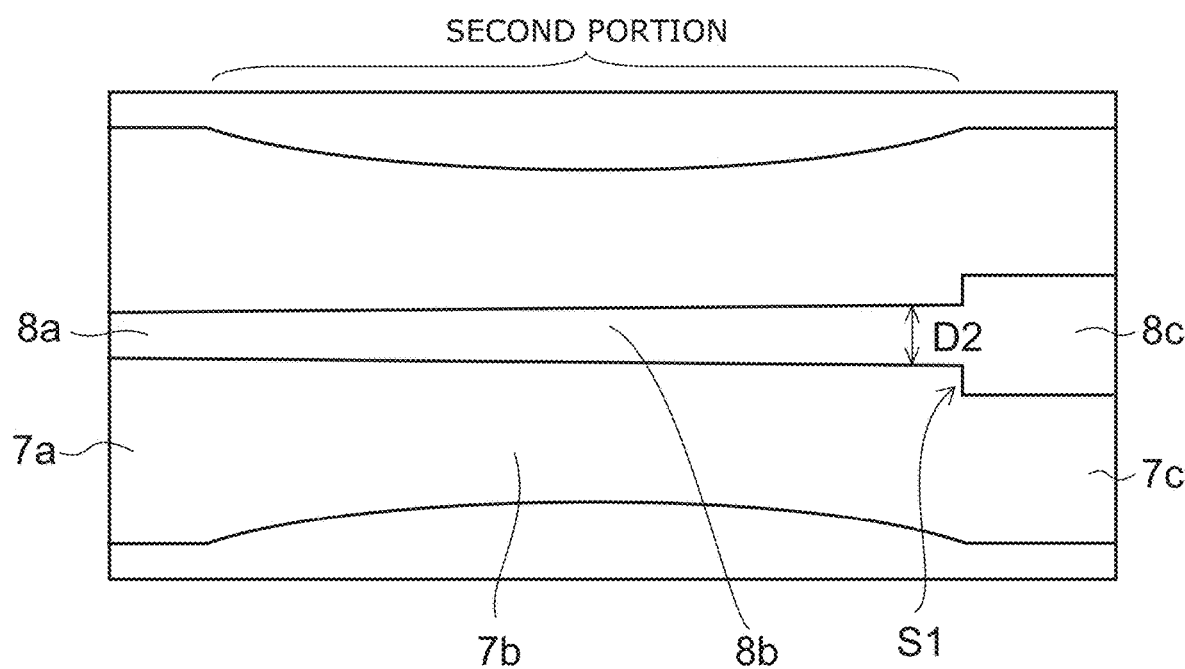
FIG. 6 is an enlarged cross-sectional view showing a state in which the second portion includes a level difference of the first embodiment of the invention.

FIG. 6 shows a state in which the core enlarges nonlinearly as the core diameter D2 at the second portion transitions from the first portion to the third portion; and a portion of the boundary between the cladding 7 and the core 8 includes a portion S1 (in the specification, this is called a level difference) substantially perpendicular to the fiber central axis C1. By providing this configuration, an advantage is provided in that this configuration can be made even in the case where it is difficult for the heat to be transferred over the entire region of the second portion when fusing.

The size of the difference between the refractive index of the cladding and the refractive index of the core at each of the portions is largest at the first portion, next largest at the second portion, and smallest at the third portion. For the reason that the second portion is formed when fusing the first portion and the third portion, the refractive index difference of the second portion is large on the first portion side; and the refractive index difference decreases gradually toward the third portion side.

In the case where the laser is condensed to the state of a beam waist diameter D7, the laser has a characteristic of spreading at the spread angle α. That is, if one of the spread angle or the beam diameter is determined, the other also is determined necessarily.

A method in which a rare earth such as erbium, germanium, or the like is added to quartz glass is known as a method for providing a refractive index difference between the core and the cladding; and the core, the cladding, or both are examples of the object of the adding. The refractive index can be adjusted by the added substance and/or the concentration in the quartz glass. The refractive index of the core and the refractive index of the cladding each are not less than about 1.4 and not more than about 1.6 at each of the first portion, the second portion, and the third portion. Because the NA (the aperture) that can be incident is determined by the refractive index difference between the core and the fiber, for the fiber used in the first portion, it is necessary to use a fiber having a refractive index difference such that the NA and the spread angle α of the laser incident on the first portion match.

If the spread angle is determined, the incident diameter also is determined; therefore, it is necessary to use a fiber having a MFD (a mode field diameter) matching the incident beam diameter and matching the refractive index difference.

It is desirable for the lengths in the central axis C1-direction of the first portion and the third portion each to be 100 μm or more to ensure a distance for the incident light to settle into a single mode; and it is desirable to adjust the second portion to be disposed at the center vicinity of the through-hole 3c of the ferrule 3.

In the fiber stub 4, the optical fiber 2 is fixed in the through-hole 3c of the ferrule 3 using the elastic member (the bonding agent) 9. Here, although a resin bonding agent such as an epoxy, silicone, or the like is an example of a material suited to the bonding agent, a high temperature-curing epoxy bonding agent is used in the example. Inside the through-hole 3*c* of the ferrule 3, the same bonding agent is filled without leaving a gap in the space existing between the optical fiber 2 and the inner wall of the ferrule 3.

Here, in the examples illustrated in FIG. 1 to FIG. 6, the fiber outer diameter D5 at the second portion is smaller than the fiber outer diameter D4 at the first portion and smaller than the fiber outer diameter D6 at the third portion; therefore, inside the through-hole 3*c*, a gap occurs between the ferrule 3 and the fiber outer perimeter at the second portion. The elastic member 9 is filled as a bonding agent into the gap without leaving a gap. Thereby, the elastic member 9 that is filled outside the fiber at the second portion becomes a wedge for the fiber; and even in the case where the fiber stub 4 and the plug ferrule inserted into the optical receptacle 1 contact each other to perform the optical connection and an external force acts parallel to the axis direction, the movement of the fiber stub 4 or the optical fiber 2 in the axis direction is suppressed.

The elastic member 9 may include bubbles as long as the function of the optical receptacle 1 is not affected. More specifically, the elastic member 9 may include bubbles as long as the undesirable decrease of the fixing strength of the optical fiber 2 due to bonding defects and movement of the optical fiber 2 due to contact with the plug ferrule can be suppressed. For example, the elastic member 9 may include bubbles such that the length in the axis direction of the optical fiber 2 (the direction along the interface between the optical fiber 2 and the ferrule 3) is 30 μm or less. For example, the elastic member 9 may include bubbles such that the maximum diameter is 30 μm or less. Thereby, even in the case where the elastic member 9 includes bubbles, undesirable effects on the function of the optical receptacle 1 can be suppressed. In this specification, the "state in which the elastic member 9 is filled" and the "state in which the elastic member 9 is filled without leaving a gap" also include the case where the elastic member 9 includes bubbles having lengths in the axis direction of 30 μm or less.

Also, the second portion is formed by fusing the first portion and the third portion; therefore, according to the formation conditions, there are cases where the strength of the second portion is lower than the strength of the first portion or the strength of the third portion. Conversely, the second portion can be reinforced by filling the elastic member 9 at the outer perimeter of the second portion.

Figure 7:
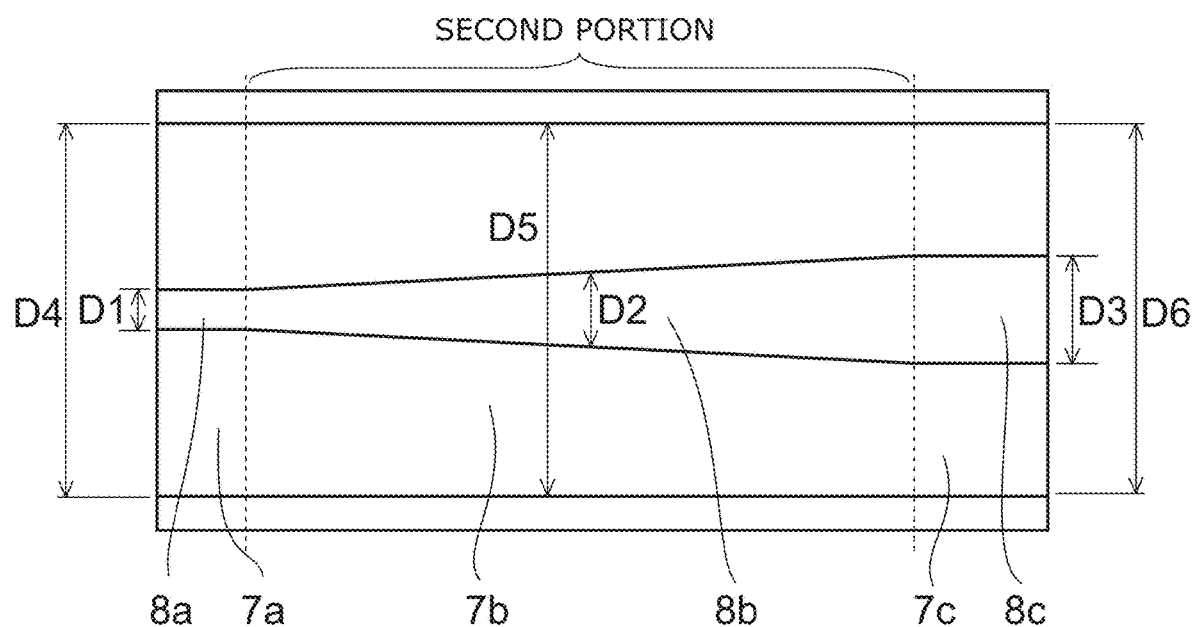
FIG. 7 is a schematic cross-sectional view approximately showing the second portion of the first embodiment of the invention.

However, in the embodiment as illustrated in FIG. 7, the fiber outer diameter D5 at the second portion may be substantially the same as the fiber outer diameter D4 at the first portion or the fiber outer diameter D5 at the third portion. By providing this configuration, the control of the electric discharge amount and/or the electric discharge timing can be relatively simple when forming the optical fiber 2 by fusing.

Also, normally, in the optical receptacle 1, to prevent reflections of the light at an end surface 2*a* of the optical fiber 2 (referring to FIG. 2) when the light is incident on the optical fiber 2 or when the light is emitted from the optical fiber 2, the end surface 2*a* of the optical fiber 2 is polished to be a plane substantially perpendicular to the central axis C1 of the ferrule 3 (the same as the central axis of the fiber stub) at the end surface 3*a* on the side opposite to the end surface 3*b* of the fiber stub 4 polished into the convex spherical surface. Here, it is desirable for substantially perpendicular to be about 85 degrees to 95 degrees with respect to the central axis C1.

In the first embodiment of the invention, the end surface 2*a* of the optical fiber 2 is polished into a plane perpendicular to the central axis C1 of the fiber stub 4; further, the end surface 2*a* of the optical fiber 2 and the end surface 3*a* of the ferrule 3 exist in substantially the same plane. Here, it is desirable for substantially the same plane to be such that the distance between the end surface 2*a* of the optical fiber 2 and the end surface 3*a* of the ferrule 3 is about −250 nm to +250 nm.

At the end surface 3*a* on the side of the fiber stub 4 opposite to the end surface 3*b* polished into the convex spherical surface, the center of the core 8 of the optical fiber 2 exists within a range of 0.005 millimeters (mm) from the center of the ferrule 3. Thereby, by controlling the position of the core 8 of the optical fiber 2, the connection loss when assembling the optical module can be small; and the optical module can be assembled easily.

Although the convex spherical surface of the fiber stub 4 normally is formed in a plane perpendicular to the central axis C1 of the ferrule 3, the convex spherical surface may be formed in a plane having a prescribed angle (e.g., 4 degrees to 10 degrees) from the perpendicular plane.

Figure 8:
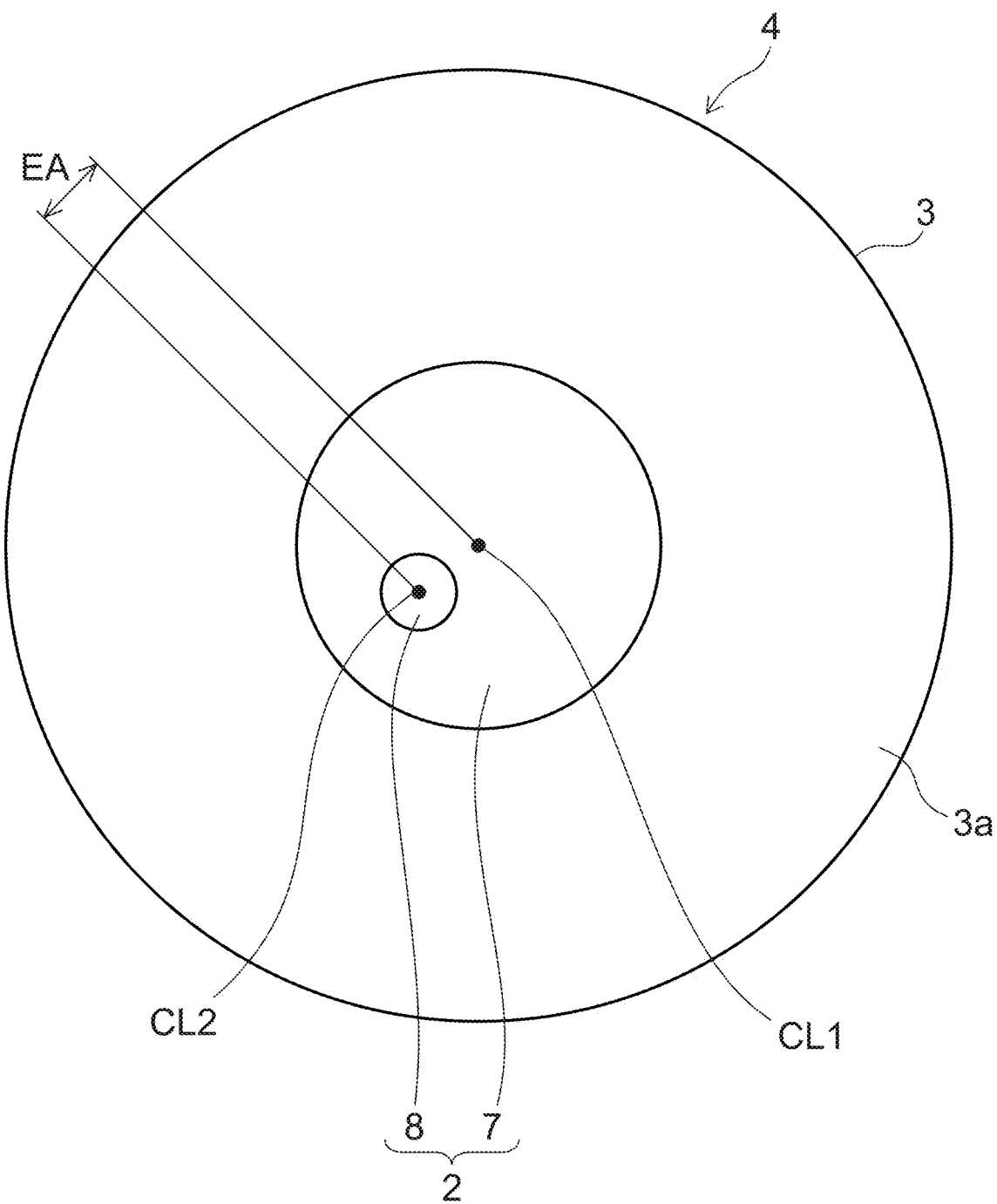
FIG. 8 is an enlarged front view of the fiber stub of the first embodiment of the invention.

FIG. 8 is an enlarged front view of the fiber stub of the first embodiment of the invention.

As illustrated in FIG. 8, there are cases where the core 8 is eccentric with respect to the ferrule 3 due to, for example, manufacturing fluctuation, etc. In such a case, at the other end surface (the end surface 3*a*) on the side opposite to the one end surface (the end surface 3*b*) optically connected to the plug ferrule, an eccentricity EA of a center CL2 of the core 8 is 7 μm or less when a center CL1 of the outer diameter of the ferrule 3 is used as a reference. Thereby, the alignment operation with the optical element such as the semiconductor laser element or the like can be easy.

Figure 9:
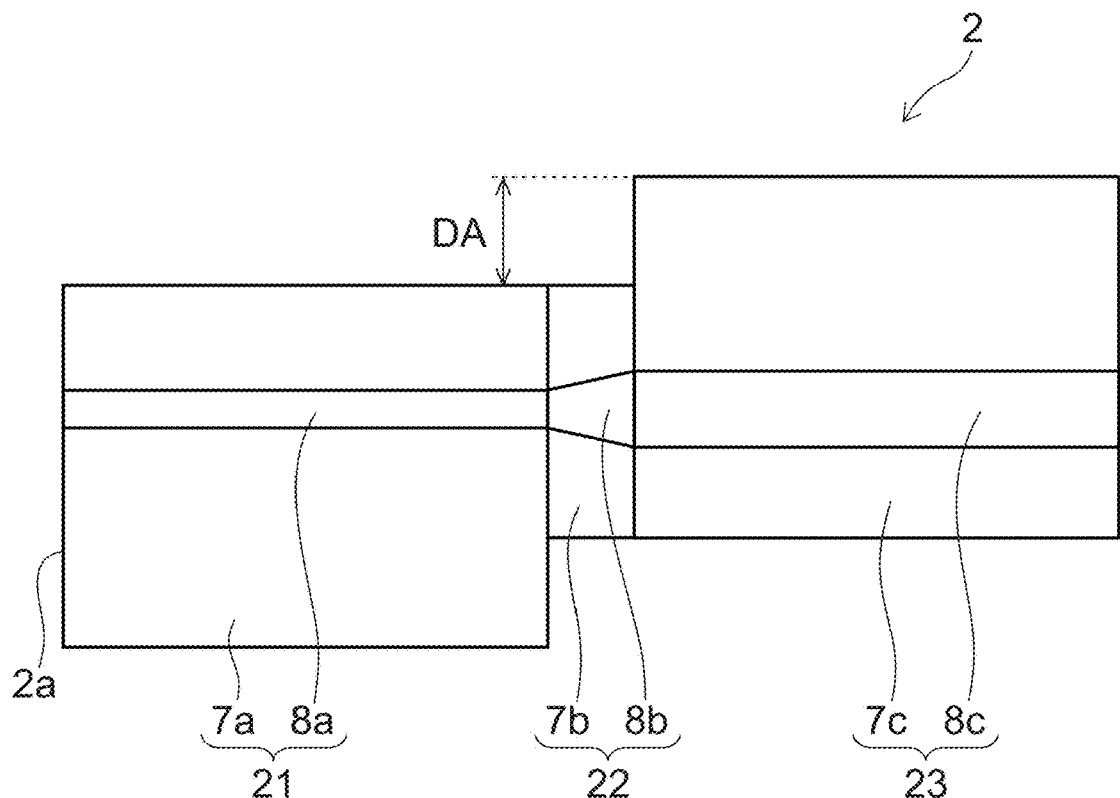
FIG. 9 is an enlarged cross-sectional view of the optical fiber of the first embodiment of the invention.

FIG. 9 is an enlarged cross-sectional view of the optical fiber of the first embodiment of the invention.

As illustrated in FIG. 9, when forming the optical fiber 2 by fusing two optical fibers, in the case where the core is eccentric with respect to the cladding for at least one of the optical fibers, the fusing is performed by aligning the centers of the cores. Therefore, there are cases where misalignment occurs between the first portion cladding 7*a* and the third portion cladding 7*c* in the direction orthogonal to the axis direction.

In such a case, a displacement amount DA between the first portion cladding 7*a* of the first portion 21 and the third portion cladding 7*c* of the third portion 23 in the direction orthogonal to the axis direction of the optical fiber 2 is 4 μm or less.

Thereby, the undesirable occurrence of the axial misalignment with the plug ferrule on the one end surface (the end surface 3*b*) side connected optically to the plug ferrule can be suppressed. The increase of the connection loss due to the axial misalignment with the plug ferrule can be suppressed. Also, for example, the undesirable snagging on the ferrule 3 of the level difference between the first portion cladding 7*a* and the third portion cladding 7*c* so that the optical fiber 2 cannot enter the ferrule 3 can be suppressed. Further, the undesirable occurrence of stress concentration in the second portion 22 due to the bonding agent, etc., that causes breakage of the optical fiber 2 can be suppressed. Thus, by setting the displacement amount DA to be small, the breakage of the optical fiber 2 can be suppressed; and the yield of the assembly can be increased.

Figure 10:
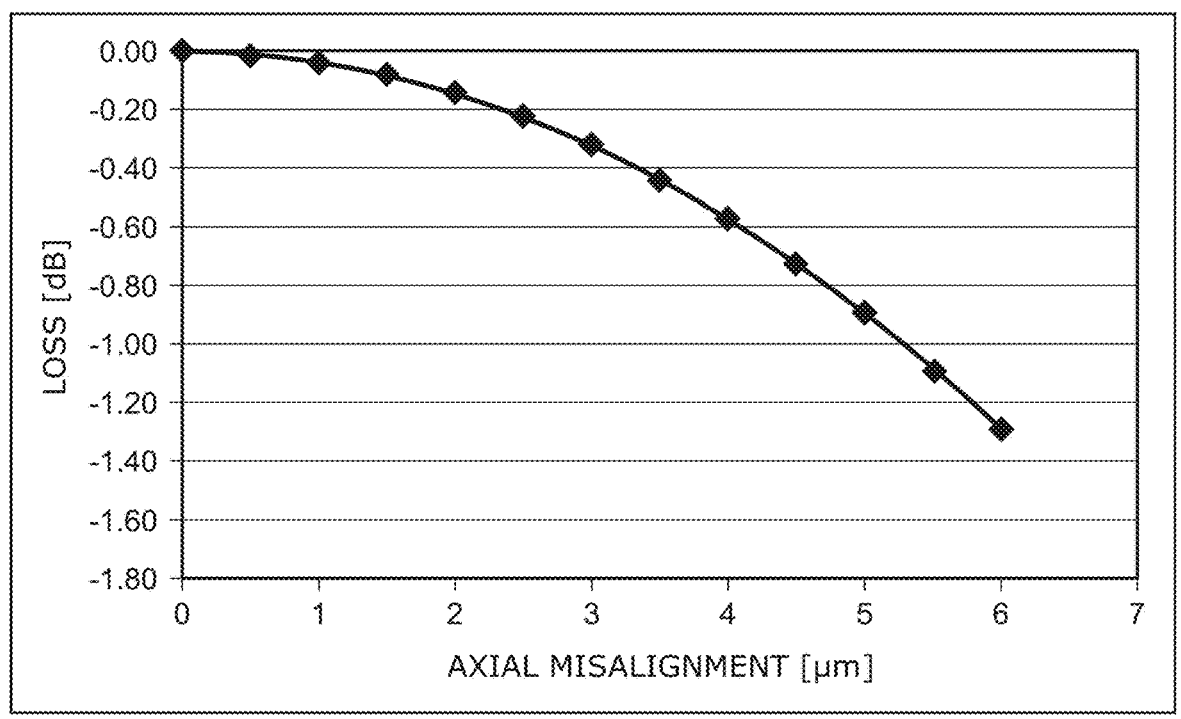
FIG. 10 is a graph illustrating the relationship between the connection loss and the axial misalignment at the optical connection surface between the fiber stub and the plug ferrule.

FIG. 10 is a graph illustrating the relationship between the connection loss and the axial misalignment at the optical connection surface between the fiber stub and the plug ferrule.

It is common to set the necessary quality of the connection loss between the fiber stub 4 and the plug ferrule on the optical connection surface side to be 0.5 dB or less. There are various loss causes; but it is considered that the effects of the axial misalignment between the fiber stub 4 and the plug ferrule are large.

For example, in the case where the displacement amount DA is 4 μm, the through-hole 3c of the ferrule 3 must be 4 μm or more to insert the optical fiber 2 into the ferrule 3. In the case where the diameter of the through-hole 3c is large, the optical fiber 2 is bonded eccentrically and has axial misalignment at the optical connection surface; and there is a possibility that the connection loss may become large. For example, the connection loss at the optical connection surface may undesirably exceed 0.5 dB and may not be able to satisfy the demands. Accordingly, as recited above, the displacement amount DA is set to be 4 μm or less. Thereby, the axial misalignment with the plug ferrule at the optical connection surface can be suppressed; and the connection loss can be suppressed. The connection loss undesirably exceeding 0.8 dB can be suppressed.

SECOND EMBODIMENT

Figure 11:
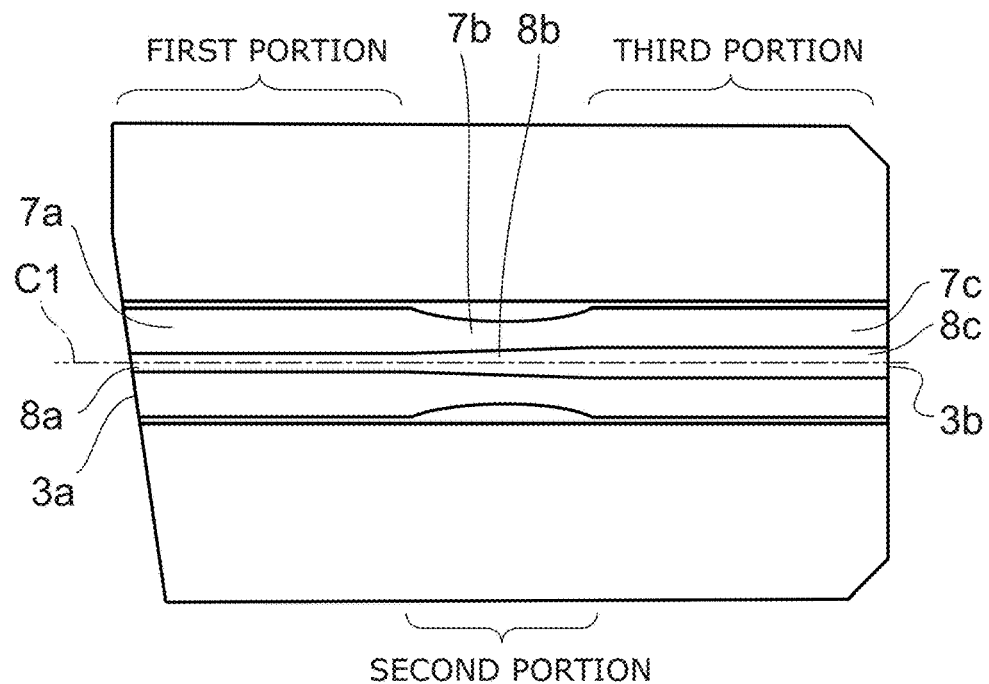
FIG. 11 is a schematic cross-sectional view of an optical receptacle showing a second embodiment of the invention.

FIG. 11 is a schematic cross-sectional view of an optical receptacle showing a second embodiment of the invention.

The members that are included in the optical receptacle 1 are similar to those of the first embodiment; and the end surface 2a of the optical fiber 2 and a portion of the end surface 3b of the ferrule 3 are polished into a plane having a prescribed angle (e.g., 4 degrees to 10 degrees) from a plane perpendicular to the central axis C1 of the ferrule 3 at the end surface 3a (referring to FIG. 11) on the side opposite to the end surface 3b (referring to FIG. 11) polished into the convex spherical surface of the ferrule 3 including the optical fiber 2 and the through-hole 3c holding the optical fiber 2.

Thereby, the light that is emitted from the light-emitting element connected to the optical receptacle 1, is incident on the optical fiber 2, and is reflected by the end surface 2a of the optical fiber 2 can be prevented from returning to the light-emitting element; and the optical element can be operated stably.

Normally, the optical fiber 2 is inserted into the through-hole 3c of the ferrule 3; and the ferrule 3 and the optical fiber 2 are polished simultaneously after fixing using a bonding agent to form the surface of the fiber stub 4 having the prescribed angle from the plane perpendicular to the central axis C1 of the ferrule 3.

In the first and second embodiments of the invention, the elastic member (the bonding agent) 9 that is for fixing the optical fiber 2 inside the through-hole 3c of the ferrule 3 is filled at the outer perimeter of a portion 2b where the outer diameter of the second portion is fine. Therefore, even in the case where a force acts parallel to the central axis C1 of the optical fiber, the elastic member acts as a wedge; the shift of the fiber in the central axis direction can be suppressed; therefore, the loss due to contact defects and the phenomenon of the fiber jutting from the ferrule do not occur easily.

An investigation relating to the core diameter and the refractive index of the optical fiber at the first portion and the length in the central axis C1-direction of the second portion performed by the inventor will now be described with reference to the drawings.

Figure 12:
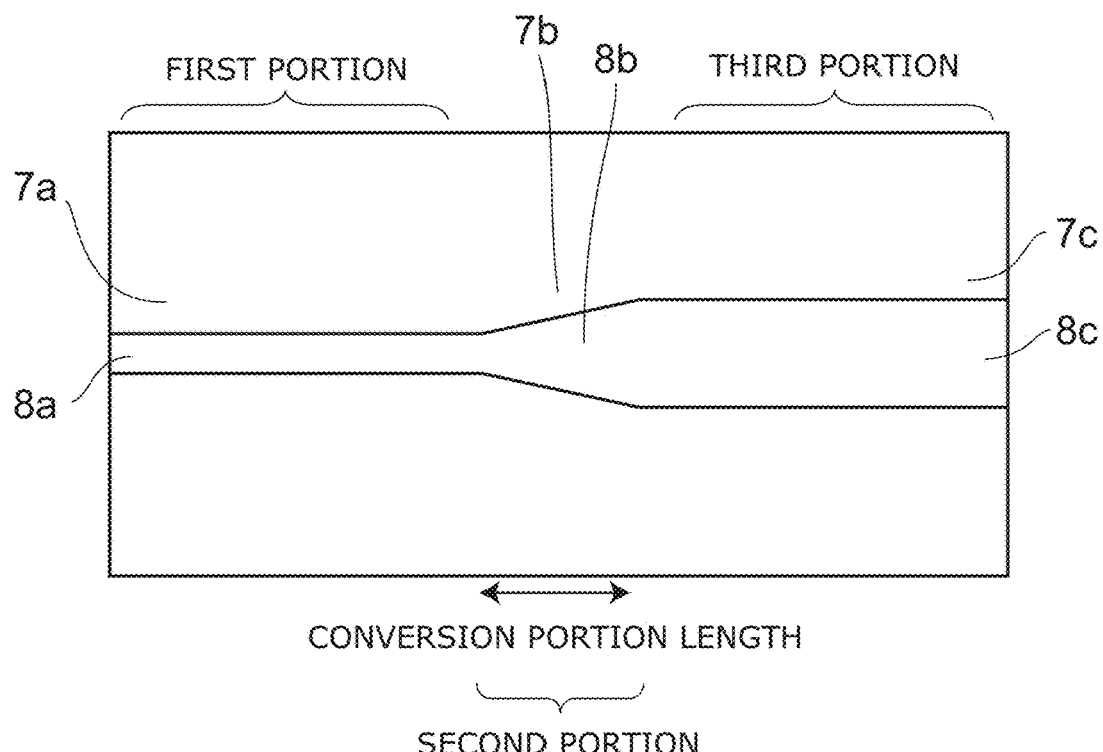
FIG. 12 is a schematic view illustrating an example of analysis regarding a conversion portion length of the second portion.
Figure 13:
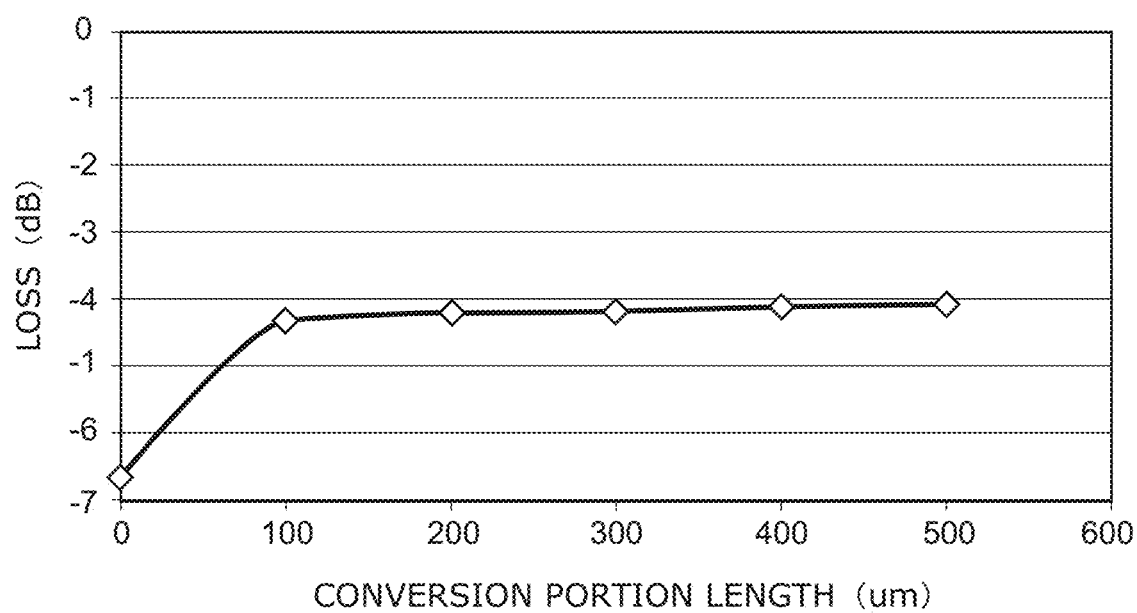
FIG. 13 is a graph illustrating an analysis result regarding a conversion portion length of the second portion.
Figure 14:
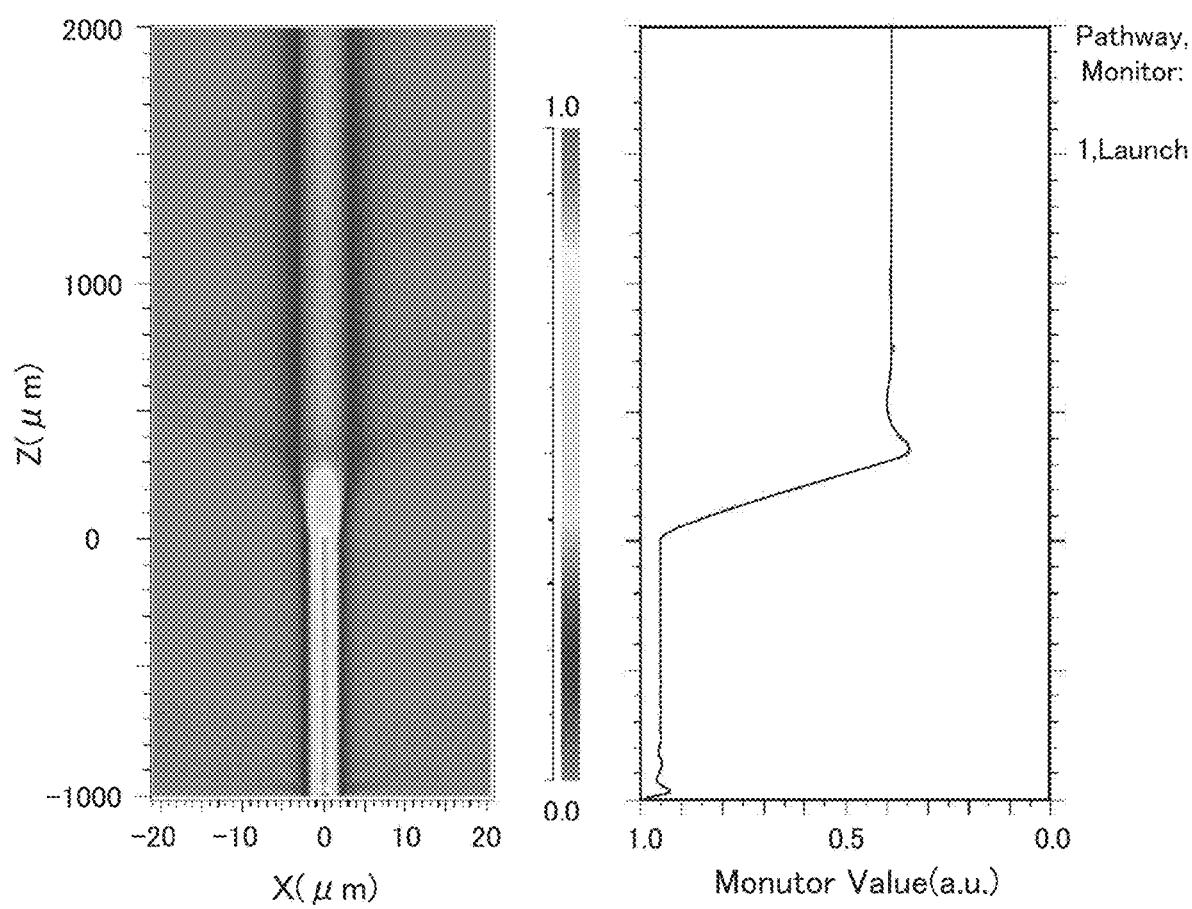
FIG. 14 is a figure showing a contour diagram and a graph of the light intensity distribution of an analysis result regarding a conversion portion length of the second portion.

FIG. 12 to FIG. 14 are schematic views illustrating an example of analysis conditions and analysis results used in the investigation.

First, the core diameter will be described.

FIG. 12 is a schematic cross-sectional view illustrating the optical fiber used in the investigation.

In the case where a beam that has a beam waist having a diameter w1 is incident on a fiber having a MFD having a diameter w2, it is known that a coupling efficiency η is determined using the following formula when assuming that there is no axial misalignment in the optical axis perpendicular direction, angle deviation, or misalignment in the optical axis direction.

$$\eta = \frac{4}{\left(\frac{w1}{w2} + \frac{w2}{w1}\right)^2} \quad \text{[Formula 1]}$$

According to this theoretical formula, it can be seen that the efficiency is 1 (100%) when w1=w2 when the beam waist of the laser and the MFD of the fiber match. Also, for a core diameter in the range of 0 to 10 μm, the MFD of a single-mode fiber fluctuates according to the wavelength; but it is known that the MFD has a diameter of 0.5 to 4 μm larger than the core diameter of the fiber. Due to this fact, it is desirable for the core diameter of the fiber to be about 0.5 to 4 μm smaller than the incident beam waist.

The refractive index difference will now be described. For the light to propagate through the single-mode fiber, it is desirable for a spread angle θ1 of the light and a light acceptance angle θ2 of the fiber to match. It is known that θ1 is determined using the following formula.

$$\theta 1 = \tan^{-1}\left(\frac{\lambda}{\pi w1}\right) = \frac{\lambda}{\pi w1} \quad \text{[Formula 2]}$$

According to this formula, the spread angle θ1 can be determined if the beam waist w1 of the incident laser beam is known. Also, the light acceptance angle θ2 of the fiber is as shown in $$\theta 2 = \sin^{-1}\sqrt{n_{\text{core}}^2 - n_{\text{clad}}^2} \quad \text{[Formula 3]}$$

and is known to be determined from the refractive index $n_{core}$ of the core and the refractive index $n_{clad}$ of the cladding.

If the incident beam waist w1 is determined, the spread angle of the beam also is determined necessarily; therefore, the refractive index difference between the core and the cladding of the fiber must be determined so that θ2=θ1. For example, in the case where quartz glass is used as the core and the cladding, the refractive indexes of the core and the cladding transition in a range of about 1.4 to 1.6.

The length in the central axis C1-direction of the second portion will now be described. Light CAE analysis was performed to confirm the effects of different lengths. In the investigation, the core diameter D1 at the first portion was set to 3 μm; the refractive index of the first portion core 8a was set to 1.49; the core diameter D3 at the third portion was set to 8.2 μm; the refractive index of the third portion core 8c was set to 1.4677; the total fiber length was set to 1000 μm; the refractive indexes of the cladding (7a, 7b, and 7c)

of the portion were set to the same 1.4624; and the beam waist diameter D7 of the incident beam was set to 3.2 µm. Under these conditions, how the light intensity changes was calculated for when the length in the central axis C1-direction of the second portion is changed 100 µm at a time from 0 µm to 500 µm. The lengths of the first portion and the third portion each were set to (1000 µm−second portion length) ÷2.

A graph in which the analysis results of the analysis are summarized is shown in FIG. 13. The horizontal axis is the length in the central axis C1-direction of the second portion; and the vertical axis is a logarithmic display of the intensity of the light at the fiber emission end when the incident light is taken to be 1. According to the analysis results, the loss in the interior of the optical fiber 2 decreases as the length in the central axis C1-direction of the second portion lengthens. The state of the change is such that the loss is reduced abruptly by increasing the length from 0 to 100 µm; and the loss is substantially flat for 100 µm or more. Thereby, it is considered that it is desirable for the length of the second portion to be 100 µm or more.

FIG. 14 is a figure showing a contour diagram and a graph of the light intensity distribution inside the fiber for an example of the analysis conditions. The vertical axis of the graph shows the distance from the incident end of the fiber; and the horizontal axis shows the intensity of the light. The graph deserves special mention in that the light substantially does not attenuate when propagating through the first portion and the third portion. The intensity of the incident light decreases due to the initial interference of the light but is stable after propagating somewhat from the emission end. Subsequently, the light enters the second portion while maintaining a constant value. In the second portion, the light intensity decreases due to the loss occurring due to the conversion of the MFD and the change of the refractive index; and the light subsequently enters the third portion. In the third portion, there is substantially no change of the intensity; and the intensity is maintained at a constant value to the emission end.

According to one embodiment of the invention, the lengths in the central axis C1-direction of the first portion and the third portion do not affect the attenuation; therefore, even when the lengths of the first portion and the third portion are changed, the function of the fiber and the loss of the entire fiber are not affected. In other words, the lengths of the first portion and the third portion can be designed to be any length by the designer; and the dimensional tolerance of the design dimensions can be large. For this advantage, exact dimensional precision such as that of a GI fiber or a lens-attached fiber is unnecessary; and this advantage can contribute greatly to the improvement of the suitability for mass production.

An investigation relating to the length of the first portion along the central axis C1-direction and the length of the third portion along the central axis C1-direction will now be described.

FIG. 15A to FIG. 15C are schematic views illustrating an example of an optical receptacle and analysis results of the optical receptacle for a reference example used in an investigation relating to the length of the first portion.

The optical receptacle of the reference example includes a fiber stub 49 shown in FIG. 15A. The structure of the fiber stub 49 of the reference example is similar to the structure of the fiber stub 4 according to the embodiment in which the first portion 21 (the first portion cladding 7a and the first portion core 8a) are not provided.

In other words, the fiber stub 49 includes an optical fiber 29, and a ferrule 39 that holds the optical fiber 29. The fiber stub 49 has an end surface 39b connected to the plug ferrule, and an end surface 39a on the side opposite to the end surface 39b. Also, the optical fiber 29 includes a second portion 229 (a conversion portion) and a third portion 239. The third portion 239 is arranged in the axis direction with the second portion 229 and is continuous with the second portion 229. The second portion 229 forms a portion of the end surface 39a; and the third portion 239 forms a portion of the end surface 39b. In the central axis C1-direction, the core diameter at the second portion 229 enlarges toward the third portion 239. The core diameter at the third portion 239 is substantially constant in the central axis C1-direction. In FIG. 15A, some of the components such as the elastic member, etc., are not illustrated for convenience.

Generally, the end surface 39a is polished into a mirror surface. Also, the end surface 39b is polished into a convex spherical configuration. Thereby, the loss of the light at the end surfaces 39a and 39b can be suppressed. In the optical receptacle, it is desirable to polish the end surfaces also from the perspectives of the connection between the optical element and the optical receptacle (e.g., using a V-shaped groove) and the removal of the adhered bonding agent.

The polishing amount of the end surface 39a is, for example, not less than 5 µm and not more than 50 µm. Thereby, the end surface that has the mirror surface can be formed.

Here, for the fiber stub 49 shown in FIG. 15A, for example, in the case where the end surface 39a is polished about 5 to 50 µm, the length of the second portion 229 becomes shorter according to the polishing amount. In other words, according to the polishing amount, the end surface position of the second portion 229 (the position of the portion of the second portion 229 exposed as a portion of the end surface 39a) fluctuates about 5 to 50 µm. That is, a core diameter Da at the end surface 39a fluctuates. This causes a loss in the case where a fiber in which the MFD changes periodically such as a GI fiber or the like is used.

The inventor of the application performed an analysis of the relationship between the loss and the polishing of the end surface 39a such as that recited above. An example of the analysis results is shown in FIG. 15B and FIG. 15C. In the investigation, before polishing the end surface 39a, a length La along the axis direction of the second portion 229 was set to 50 µm; the core diameter Da at the end surface 39a was set to 3 µm; and a core diameter Db at the end surface 39b was set to 9 µm. The change rate along the axis direction of the core diameter at the second portion 229 was constant.

FIG. 15B illustrates the loss (dB) in the case where the length La is shortened by polishing the end surface 39a 20% (a polishing amount of 10 µm), 40% (a polishing amount of 20 µm), 60% (a polishing amount of 30 µm), or 80% (a polishing amount of 40 µm) for the fiber stub 49 such as that recited above. FIG. 15C is a graph illustrating the data of FIG. 15B. Here, the loss (dB) is calculated from the intensity of the light at the emission end (the end surface 39b) in the case where the light (the diameter DL=3 µm) enters from the end surface 39a.

Before the polishing of the end surface 39a is performed, the loss is −1.06 dB. From the graph, it can be seen that the loss increases as the second portion 229 is shortened by the polishing. For example, the loss becomes about −3 dB when the conversion portion (the second portion 229) becomes 50% shorter due to the polishing.

Thus, in the reference example in which the first portion is not provided, the loss is undesirably increased by polishing the end surface. Also, in the reference example, even in the case where the core diameter at the end surface before polishing is determined by considering the polishing amount beforehand, the loss fluctuates according to the fluctuation of the polishing amount. It becomes necessary to strictly control the polishing amount; and the suitability for mass production may decrease.

Conversely, in the optical receptacle according to the embodiment, the first portion is provided in which the core diameter and the refractive index substantially do not change along the central axis C1. Even in the case where the length of the first portion along the central axis C1 fluctuates due to the polishing of the end surface 3a, the increase of the optical loss and the change of the fluctuation are small. For example, even in the case where the end surface position is changed within the range of the length of the first portion, the characteristics of the optical receptacle substantially do not degrade.

Thus, it is desirable for the length along the central axis C1 of the first portion to be not less than the polishing amount of the end surface 3a. As described above, to provide the end surface 3a with the mirror surface, the end surface 3a is polished by an amount that is not less than about 5 μm and not more than about 50 μm. Accordingly, it is desirable for the length along the central axis C1 of the first portion to be 5 μm or more, and if possible, it is more desirable to be 50 μm or more. The upper limit of the length along the central axis C1 of the first portion is not particularly limited as long as the second portion and the third portion can be disposed inside the fiber stub 4 (inside the through-hole of the ferrule 3). To this end, according to the total length of the fiber stub 4, the first portion may be elongated to about 7 to 10 mm. Thereby, the suitability for mass production can be improved.

For example, the description relating to FIG. 15A to FIG. 15C is similar also for a reference example that does not include the third portion. In other words, in such a case, the core diameter at the end surface connected to the plug ferrule changes according to the polishing amount. The loss is increased by changing the core diameter at the end surface. Conversely, in the optical receptacle according to the embodiment, the third portion is provided in which the core diameter and the refractive index substantially do not change along the central axis C1. Even in the case where the length of the third portion along the central axis C1 fluctuates due to the polishing of the end surface 3b, the increase of the optical loss and the change of the fluctuation are small.

Thus, it is desirable for the length along the central axis C1 of the third portion to be not less than the polishing amount of the end surface 3b. For example, because the end surface 3b has the convex spherical configuration, the end surface 3b is polished an amount that is not less than about 5 μm and not more than about 20 μm. Accordingly, it is desirable for the length along the central axis C1 of the third portion to be 5 μm or more, and if possible, more desirably 20 μm or more. The upper limit of the length along the central axis C1 of the third portion is not particularly limited as long as the first portion and the second portion can be disposed inside the fiber stub 4 (inside the through-hole of the ferrule 3). To this end, according to the total length of the fiber stub 4, the third portion may be elongated to about 7 to 10 mm. Thereby, the suitability for mass production can be improved.

According to the embodiment as described above, the length of the optical module can be reduced because the core diameter D1 at the end surface 3a on the side of the fiber stub 4 opposite to the end surface 3b polished into the convex spherical surface is smaller than the core diameter D2 at the end surface 3b polished into the convex spherical surface. Also, it is unnecessary to perform dimensional control with high precision for the axis-direction lengths of the first portion and the third portion.

Because the fiber outer diameter D5 at the second portion is smaller than the through-hole 3c of the cladding, the movement of the fiber in the central axis direction can be deterred by filling the elastic member 9 into the gap.

THIRD EMBODIMENT

Figure 16A:
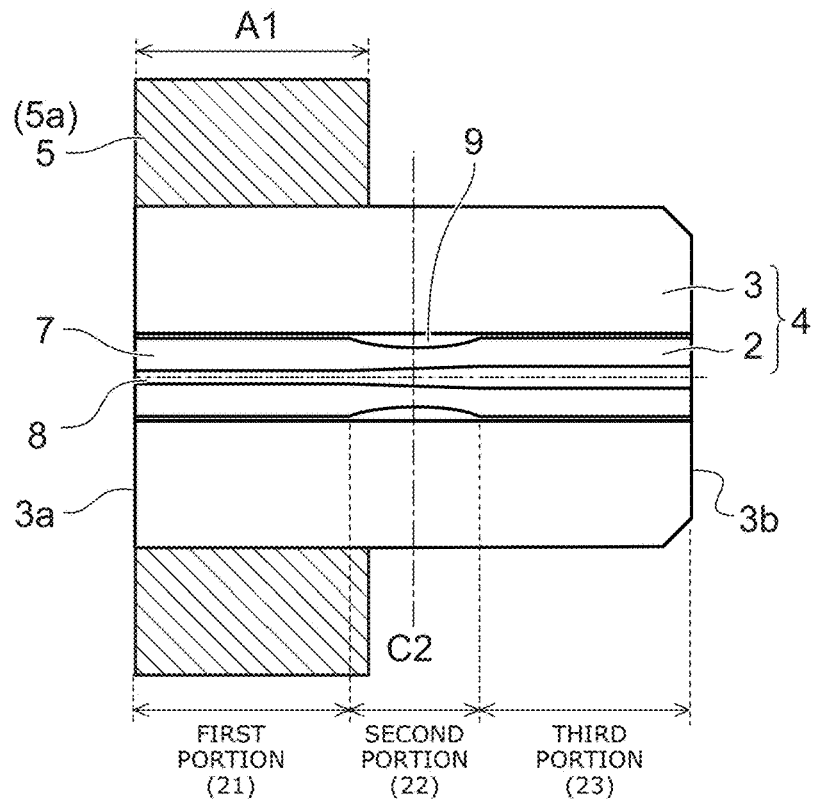
FIG. 16A and FIG. 16B are schematic cross-sectional views illustrating portions of optical receptacles according to a third embodiment of the invention.
Figure 16B:
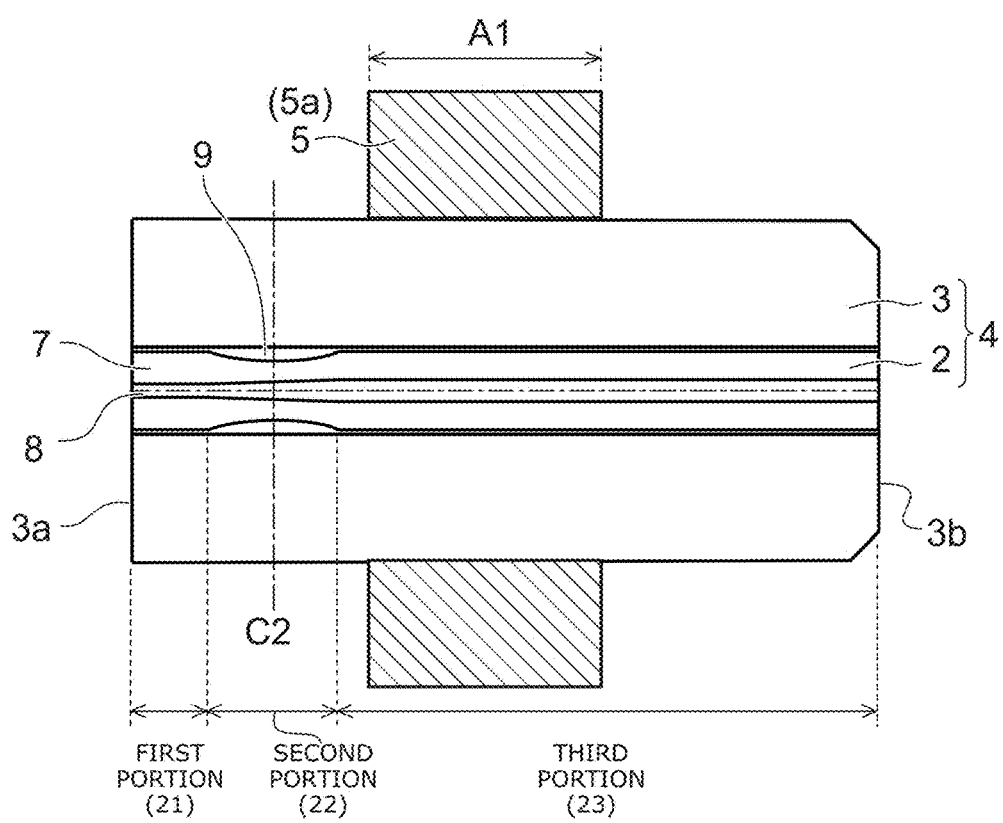

FIG. 16A and FIG. 16B are schematic cross-sectional views illustrating portions of optical receptacles according to a third embodiment of the invention.

In FIG. 16A and FIG. 16B, the portions of the fiber stub 4 and the holder 5 (the bush 5a) of the optical receptacle according to the embodiment are illustrated as being enlarged.

In the example as illustrated in FIG. 16A, an axis-direction central portion C2 of the second portion 22 of the optical fiber 2 is disposed not to overlap a region A1 where the ferrule 3 and the holder 5 (the bush 5a) are in contact. In other words, the axis-direction central portion C2 of the second portion 22 is provided at a position where the fiber stub 4 is not press-fitted into the holder 5 (the bush 5a). The axis direction is, for example, the direction in which the first portion 21, the second portion 22, and the third portion 23 are arranged. In other words, the axis direction is the direction in which the optical fiber 2 extends. More specifically, the axis-direction central portion C2 is the center in the axis direction of the second portion 22 where the core diameter D2 changes gradually.

As described above, for example, the second portion 22 is formed by fusing the first portion 21 and the third portion 23 and by pulling the fused portion while applying heat. In such a case, the cladding exterior form changes at the fused portion. The cladding outer diameter at the second portion 22 is finer than the cladding outer diameter at the first portion 21 and the cladding outer diameter at the third portion 23. Therefore, the strength of the second portion 22 is lower than the strengths of the first portion 21 and the third portion 23. Also, at the fused portion, there is also a possibility that defects and/or gaps may occur inside the optical fiber 2. In such a case, the strength of the second portion 22 undesirably decreases further.

In such a case, as illustrated in FIG. 16A, the axis-direction central portion C2 of the second portion 22 is disposed not to overlap the region A1 where the ferrule 3 and the holder 5 (the bush 5a) are in contact. Thereby, for example, even in the case where the second portion 22 is formed by the fusing, etc., the undesirable application of stress to the second portion 22 which has a lower relative strength than the first portion 21 and the third portion 23, the occurrence of fiber breakage at the second portion 22, etc., can be suppressed. The reliability of the optical receptacle 1 can be increased further.

In FIG. 16A, the axis-direction central portion C2 of the second portion 22 is shifted toward the end surface 3b side connected optically to the plug ferrule with respect to the region A1. As illustrated in FIG. 16B, the axis-direction central portion C2 of the second portion 22 may be shifted toward the end surface 3a side connected optically to the optical element with respect to the region A1.

Also, in FIG. 16A, a portion of the second portion 22 overlaps the region A1. This is not limited thereto; and the entire second portion 22 may not overlap the region A1 as illustrated in FIG. 16B. In the case where the entire second portion 22 does not overlap the region A1, the undesirable application of stress to the second portion 22 and the occurrence of fiber breakage, etc., can be suppressed further. On the other hand, in the case where a portion of the second portion 22 overlaps the region A1, the length in the axis direction of the fiber stub 4 can be shorter.

FOURTH EMBODIMENT

Figure 17:
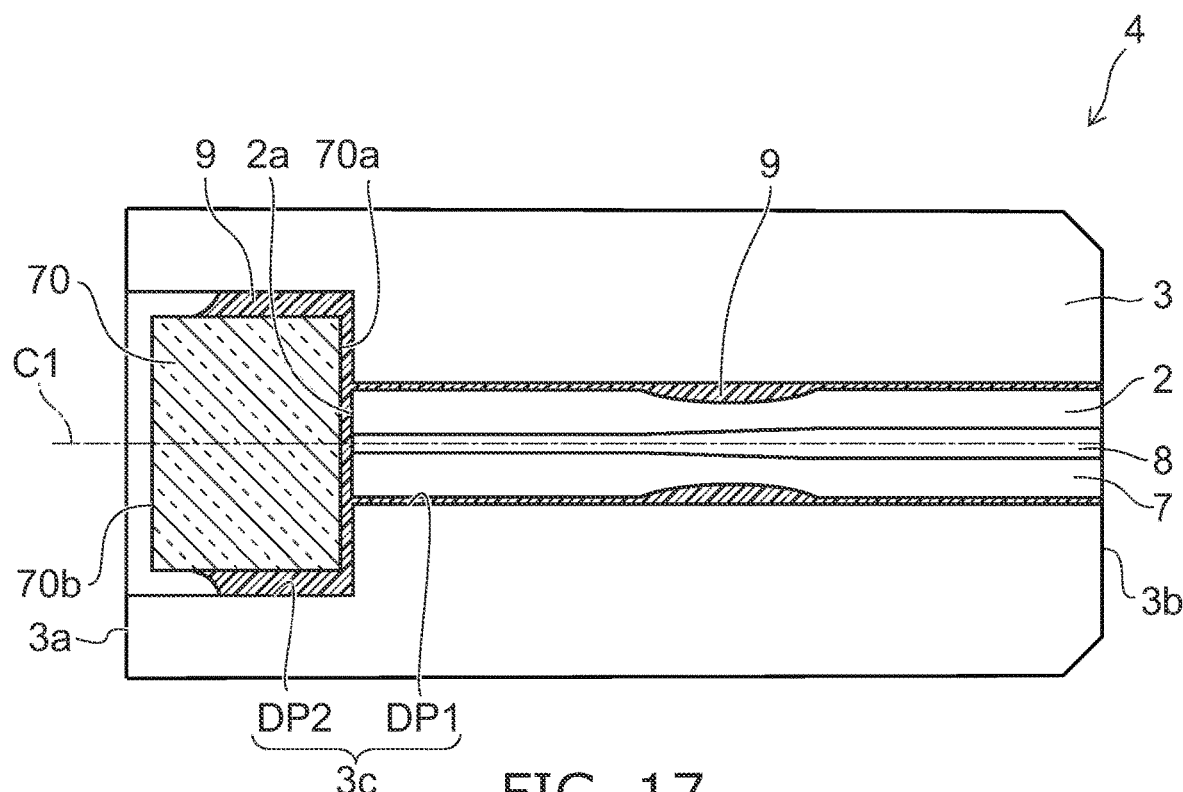
FIG. 17 is a schematic cross-sectional view illustrating a portion of an optical receptacle according to a fourth embodiment of the invention.

FIG. 17 is a schematic cross-sectional view illustrating a portion of an optical receptacle according to a fourth embodiment of the invention.

In FIG. 17, a portion of the fiber stub 4 of the optical receptacle according to the embodiment is illustrated as being enlarged.

In the example as illustrated in FIG. 17, the fiber stub 4 further includes a transparent member 70 fixed to the ferrule 3. The through-hole 3c of the ferrule 3 includes a small diameter portion DP1 and a large diameter portion DP2. The large diameter portion DP2 is provided on the end surface 3a side of the small diameter portion DP1. Also, the large diameter portion DP2 has a diameter that is larger than that of the small diameter portion DP1. In other words, the diameter of the large diameter portion DP2 is the width in a direction orthogonal to the axis direction. The large diameter portion DP2 is the portion of the through-hole 3c provided on the end surface 3a side of the small diameter portion DP1 and having a wider width than the small diameter portion DP2. Also, for example, the diameter of the large diameter portion DP2 may widen toward the end surface 3a side.

In the example, the entire optical fiber 2 is disposed in the small diameter portion DP1. The transparent member 70 is disposed in the large diameter portion DP2. For example, the entire transparent member 70 is provided inside the large diameter portion DP2. A portion of the transparent member 70 may protrude from the ferrule 3. In other words, it is sufficient for at least a portion of the transparent member 70 to be provided inside the large diameter portion DP2.

In a cross section orthogonal to the axis direction, the cross-sectional configurations of the transparent member 70 and the large diameter portion DP2 are, for example, rectangular configurations. The cross-sectional configurations of the transparent member 70 and the large diameter portion DP2 may be circles or may be ellipses or polygons.

The elastic member 9 is provided in the gap between the optical fiber 2 and the small diameter portion DP1 of the through-hole 3c of the ferrule 3 and is provided in the gap between the transparent member 70 and the large diameter portion DP2 and in the gap between the optical fiber 2 and the transparent member 70. In other words, the elastic member 9 is filled into the gap between the optical fiber 2 and the small diameter portion DP1 of the through-hole 3c of the ferrule 3 and is filled into the gap between the transparent member 70 and the large diameter portion DP2 and the gap between the optical fiber 2 and the transparent member 70. Thereby, the optical fiber 2 and the transparent member 70 are fixedly bonded using the elastic member 9 inside the through-hole 3c of the ferrule 3.

The end surface 2a of the optical fiber 2 on the side opposite to the side optically connected to the plug ferrule is closely adhered to the elastic member 9. An end surface 70a of the transparent member 70 on the optical fiber 2 side is closely adhered to the elastic member 9. The elastic member 9 and the transparent member 70 are transparent. Thereby, the light that is irradiated from the optical element is incident on the optical fiber 2 via the transparent member 70 and the elastic member 9; and the light that is emitted from the optical fiber 2 is incident on the optical element via the transparent member 70 and the elastic member 9.

At least a portion of an end surface 70b of the transparent member 70 on the side opposite to the optical fiber 2 is in a plane substantially perpendicular to the central axis C1 of the optical receptacle 1. Here, substantially perpendicular is, for example, an angle not less than about 85 degrees and not more than about 95 degrees with respect to the central axis C1 of the optical receptacle 1.

A method that uses a polishing film having a diamond abrasive or the like may be used as the method when forming the end surface 70b of the transparent member 70 into a plane. Also, it is desirable for the surface roughness of the end surface 70b of the transparent member 70 to have an arithmetic average roughness of 0.1 micrometers or less to set the reflection amount of the light to be as small as possible.

The elastic member 9 is filled without leaving a gap between the optical fiber 2 and the small diameter portion DP1. Thereby, the bias of the elastic member 9 filled into the periphery of the optical fiber 2 is small; and the occurrence of breaking and/or cracks of the optical fiber 2 due to the difference between the thermal expansion coefficient of the elastic member 9 and the thermal expansion coefficient of the optical fiber 2 when the optical receptacle 1 is exposed to a temperature change can be suppressed. Further, the fluctuation amount in the diametral direction inside the through-hole 3c of the ferrule 3 of the end surface 2a of the optical fiber 2 on the side opposite to the side optically connected to the plug ferrule is small; therefore, the time for aligning the light-emitting element and/or the light receiving element and the end surface of the optical fiber 2 is reduced. Here, the material of the elastic member 9 at the small diameter portion DP1 may be different from the material of the elastic member 9 at the large diameter portion DP2.

It is desirable for the elastic member 9 and the transparent member 70 each to have substantially the same refractive index as the refractive index of the core of the optical fiber 2. Here, substantially the same refractive index is not less than about 1.4 and not more than about 1.6. The refractive index of the core of the optical fiber 2 is, for example, not less than about 1.46 and not more than about 1.47. The refractive index of the elastic member 9 is, for example, not less than about 1.4 and not more than about 1.5. The refractive index of the transparent member 70 is, for example, not less than about 1.4 and not more than about 1.6. Thereby, the reflections of light at the interface between the transparent member 70 and the elastic member 9 and the interface between the elastic member 9 and the optical fiber 2 can be reduced; and the coupling efficiency of the optical module increases.

The elastic member 9 has a low elastic modulus compared to those of the ceramic used as the material of the ferrule 3 and the quartz glass used as the material of the optical fiber 2. For example, an epoxy resin, an acrylic resin, a silicon resin, etc., are examples.

In an optical receptacle, it is general to perform polishing so that the end surface 2a of the optical fiber 2 is a mirror surface-like plane to reduce the reflections. Conversely, in the configuration illustrated in FIG. 17, the reflections of the light at the end surface 2a can be reduced without similarly performing polishing of the end surface 2a of the optical fiber 2. Further, the fixing strength of the transparent member 70 can be ensured.

Also, by providing the third portion 23 in the optical fiber 2, when the light is incident on the optical fiber 2 from an optical member such as a fine waveguide or the like, the undesirable extension of the optical connection distance due to beam diameter conversion typified by a zoom lens or the like can be suppressed; the incident surface can be disposed further in the receptacle interior by providing the large diameter portion DP2 in the ferrule 3; and the optical connection distance from the plug connection surface of the optical receptacle 1 to the waveguide can be shorter. For example, downsizing of the optical receptacle 1 can be realized.

Figure 18:
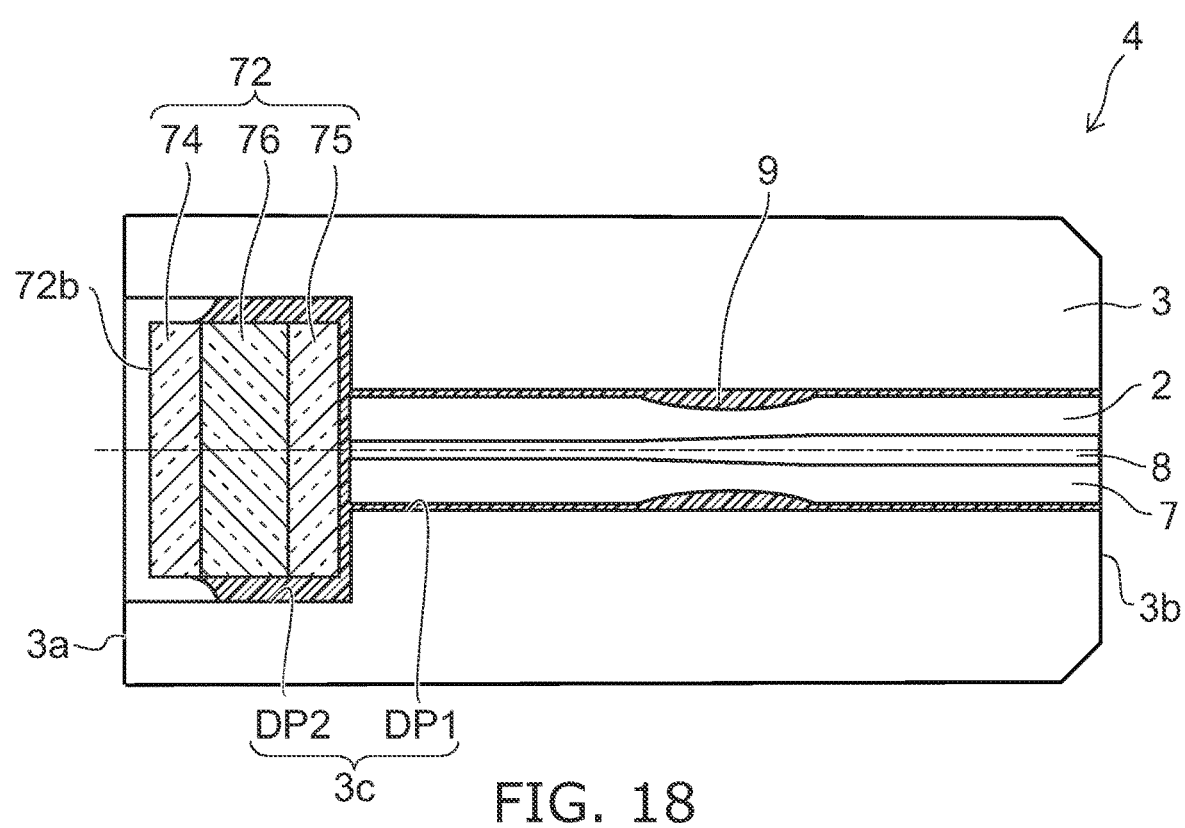
FIG. 18 is a schematic cross-sectional view illustrating a modification of the optical receptacle according to the fourth embodiment of the invention.

FIG. 18 is a schematic cross-sectional view illustrating a modification of the optical receptacle according to the fourth embodiment of the invention.

The example illustrated in FIG. 18 has a structure in which the transparent member 70 of the optical receptacle described in reference to FIG. 17 is replaced with an isolator 72. Other than the isolator 72, the configuration of the optical receptacle illustrated in FIG. 18 is substantially the same as that of the optical receptacle described in reference to FIG. 17.

The isolator 72 includes a first polarizer 74, a second polarizer 75, and a Faraday rotator 76. The Faraday rotator 76 is provided between the first polarizer 74 and the second polarizer 75. The Faraday rotator 76 includes, for example, a material such as garnet, etc. Thereby, the light that is emitted from the light-emitting element and is incident on the optical fiber 2 or the light that is emitted from the optical fiber 2 and is incident on the light receiving element can be transmitted in one direction.

Thus, the isolator 72 may be used as the transparent member 70. In the case where the isolator 72 is used, for example, the reflections of the light at an end surface 72b of the isolator 72 can be suppressed or the reflected light returning to the light-emitting element can be suppressed; and the light-emitting element can be operated stably. Also, for example, an AR (anti-reflective) coating may be provided on the end surface 72b of the isolator 72 on the side opposite to the optical fiber 2.

FIFTH EMBODIMENT

Figure 19:
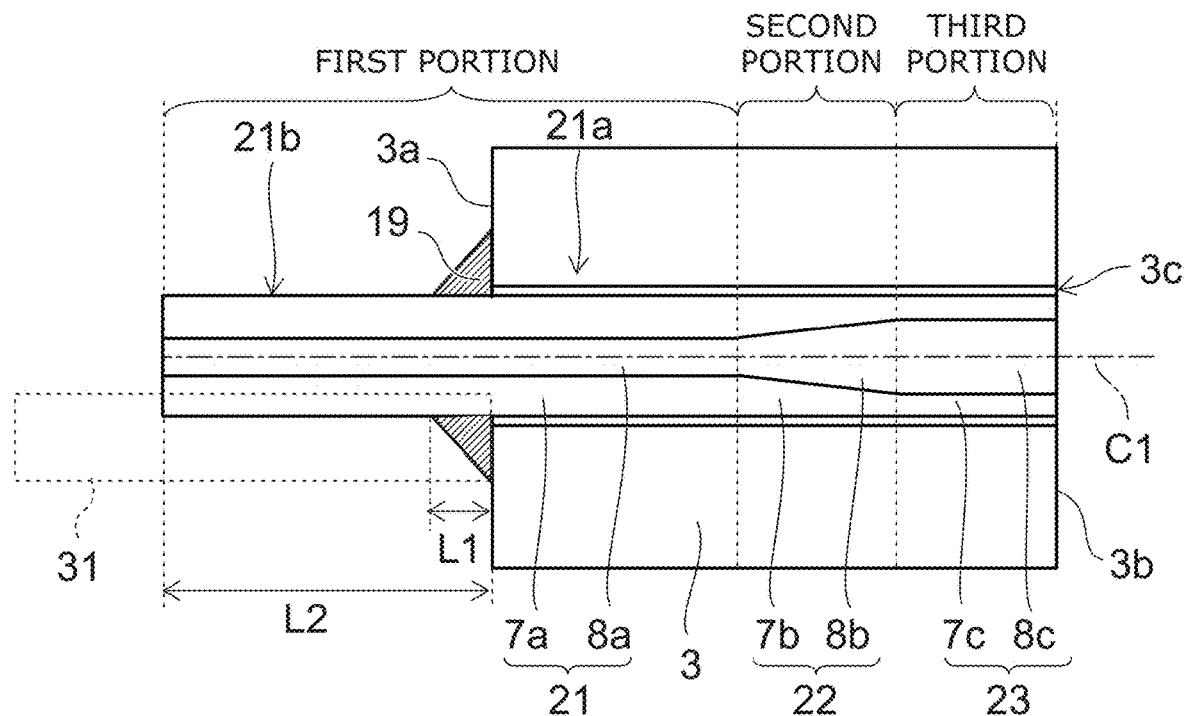
FIG. 19 is a schematic cross-sectional view illustrating a portion of an optical receptacle according to a fifth embodiment of the invention.

FIG. 19 is a schematic cross-sectional view illustrating a portion of an optical receptacle according to a fifth embodiment of the invention.

FIG. 19 illustrates a portion of the fiber stub 4 of the optical receptacle according to the embodiment as being enlarged. As illustrated in FIG. 19, the first portion (the first portion 21) includes a portion (an inner portion 21a) disposed inside the through-hole 3c of the ferrule 3, and a portion (a protruding portion 21b) disposed outside the through-hole 3c. Also, the optical receptacle according to the embodiment includes an elastic member 19. Otherwise, the embodiment is similar to the first or second embodiment.

The protruding portion 21b protrudes outside from the ferrule 3 (the surface of the ferrule 3 on the side opposite to the end surface 3b). In other words, the protruding portion 21b is not arranged with the ferrule 3 in a direction orthogonal to the central axis C1. The inner portion 21a is arranged with the ferrule 3 in the direction orthogonal to the central axis C1 and is surrounded with the ferrule 3 when viewed along the central axis C1.

Also, the entire region of the second portion and the entire region of the third portion each are disposed inside the through-hole 3c. In other words, the entire region of the second portion and the entire region of the third portion are arranged with the ferrule 3 in the direction orthogonal to the central axis C1 and are surrounded with the ferrule 3 when viewed along the central axis C1.

As described above, a module of semiconductor laser elements, etc., and/or an optical element are provided on the side of the optical receptacle opposite to the end surface 3b. In FIG. 19, one portion 31 of the optical element is shown as an example.

For example, the one portion 31 of the optical element has a configuration (a groove, etc.) corresponding to the protruding portion 21b. When assembling the optical element and the optical receptacle, the protruding portion 21b is placed on the one portion 31 of the optical element, etc., and is directly pressed onto the light-emitting end of the optical element. Or, the light is caused to be incident on the protruding portion 21 from the light-emitting end by using an element such as a lens, etc. Thereby, the effort for the alignment when assembling can be reduced. Also, the precision of the alignment can be increased; and the optical connection loss can be reduced.

The elastic member 19 is provided at the end portion of the protruding portion 21b on the third portion side. For example, the elastic member 19 contacts the protruding portion 21b and the ferrule 3. Thereby, the elastic member 19 protects the first portion. A length L1 along the central axis C1-direction of the elastic member 19 is, for example, about 2 mm. Therefore, it is desirable for a length L2 along the central axis C1-direction of the protruding portion 21b to be 2 mm or more. Also, it is desirable for the length L2 of the protruding portion 21b to be 20 mm or less from the perspectives of ensuring the strength of the first portion and downsizing the optical receptacle. However, the length L2 of the protruding portion 21b may be set to be 100 mm or less according to the application of the optical receptacle. The second portion and the third portion are protected by the ferrule 3 because the second portion and the third portion are disposed in the interior of the through-hole 3c.

SIXTH EMBODIMENT

Figure 20:
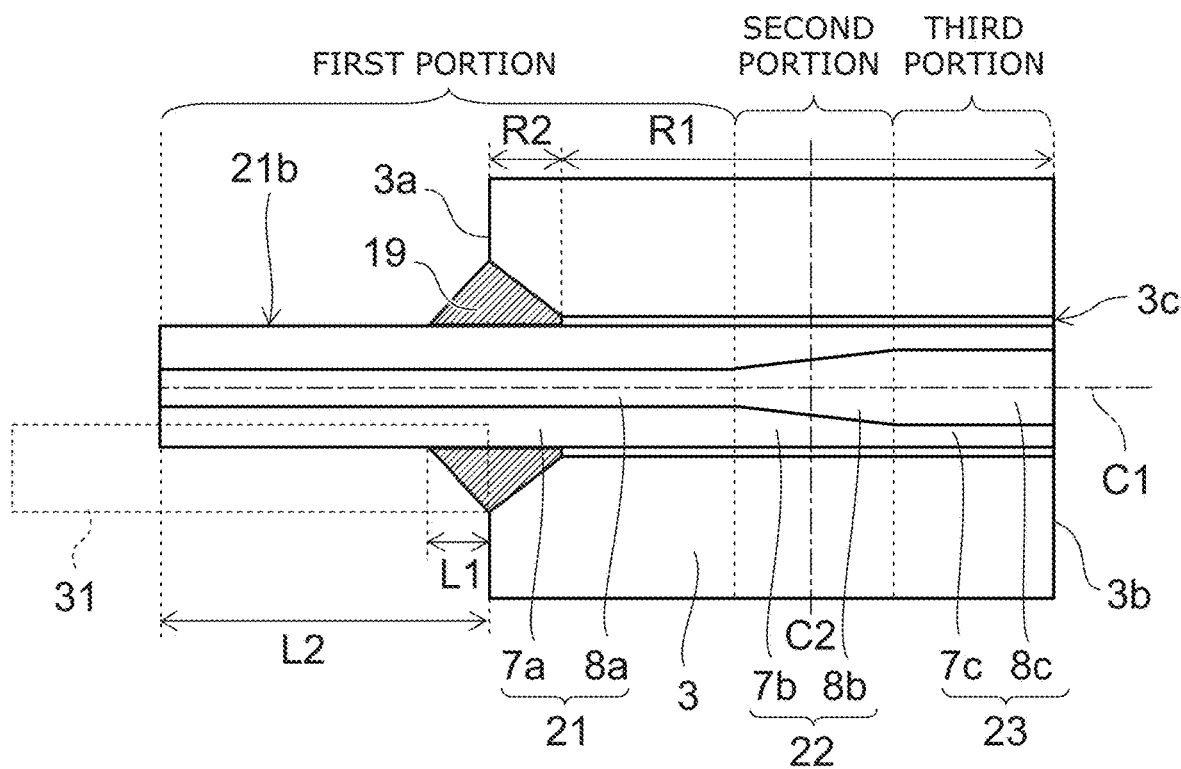
FIG. 20 is a schematic cross-sectional view illustrating a portion of an optical receptacle according to a sixth embodiment of the invention.

FIG. 20 is a schematic cross-sectional view illustrating a portion of an optical receptacle according to a sixth embodiment of the invention.

FIG. 20 illustrates a portion of the fiber stub 4 of the optical receptacle according to the embodiment as being enlarged.

In the example as illustrated in FIG. 20, the through-hole 3c of the ferrule 3 includes a first region R1 and a second region R2. Other than the through-hole 3c, the configuration of the optical receptacle illustrated in FIG. 20 is substantially the same as that of the optical receptacle described in reference to FIG. 19.

The first region R1 is a region where the width in an orthogonal direction orthogonal to the axis direction corresponds to the width in the orthogonal direction of the optical fiber 2. In other words, the first region R1 is a portion of the through-hole 3c having substantially the same diameter as the outer diameter of the optical fiber 2. The diameter of the first region R1 is substantially constant along the axis direction. Also, the first region R1 is continuous with the end surface 3b of the ferrule 3. The ferrule 3 holds the optical fiber 2 in the first region R1.

The second region R2 is disposed on the end surface 3a side of the first region R1. The second region R2 is continuous with the first region R1. Also, in the example, the second region R2 is continuous with the end surface 3a of the ferrule 3. The second region R2 is a region where the width in the orthogonal direction widens toward the end surface 3a side of the ferrule 3. In other words, the second region R2 is a portion of the through-hole 3c where the diameter widens toward the end surface 3a side.

In the second region R2, for example, the diameter widens continuously toward the end surface 3a side. For example, the diameter in the second region R2 may widen in steps toward the end surface 3a side. However, by setting the diameter of the second region R2 to widen continuously, for example, when inserting the optical fiber 2 into the through-hole 3c, the tip of the optical fiber 2 can be inserted easily into the through-hole 3c along the tilt of the second region R2. For example, the manufacturability of the optical receptacle 1 can be improved. For example, the elastic member 19 is filled into the second region R2.

The axis-direction central portion C2 of the second portion 22 is disposed to overlap the first region R1. In the example, the entire second portion 22 is disposed to overlap the first region R1. For example, a portion of the second portion 22 on the end surface 3a side may overlap the second region R2. It is sufficient for at least the axis-direction central portion C2 of the second portion 22 to overlap the first region R1.

Thus, the second region R2 is provided in the through-hole 3c of the ferrule 3. Thereby, the optical fiber 2 is inserted easily in the through-hole 3c; and the manufacturability of the optical receptacle 1 can be improved. Then, in such a case, the axis-direction central portion C2 of the second portion 22 is disposed to overlap the first region R1. Thereby, the application of external stress to the second portion 22 can be suppressed; and the occurrence of fiber damage at the second portion 22, etc., can be suppressed. Also, the application of external stress to the second portion 22 can be suppressed further by disposing the entire second portion 22 to overlap the first region R1.

For example, the holder 5 (the bush 5a) holds a portion of the outer side surface of the ferrule 3 opposing the first region R1 and a portion of the outer side surface of the ferrule 3 opposing the second region R2. In such a case, as described above, the axis-direction central portion C2 of the second portion 22 is disposed not to overlap the region A1 where the ferrule 3 and the holder 5 (the bush 5a) are in contact. Thereby, the occurrence of fiber breakage, etc., can be suppressed.

Figure 21:
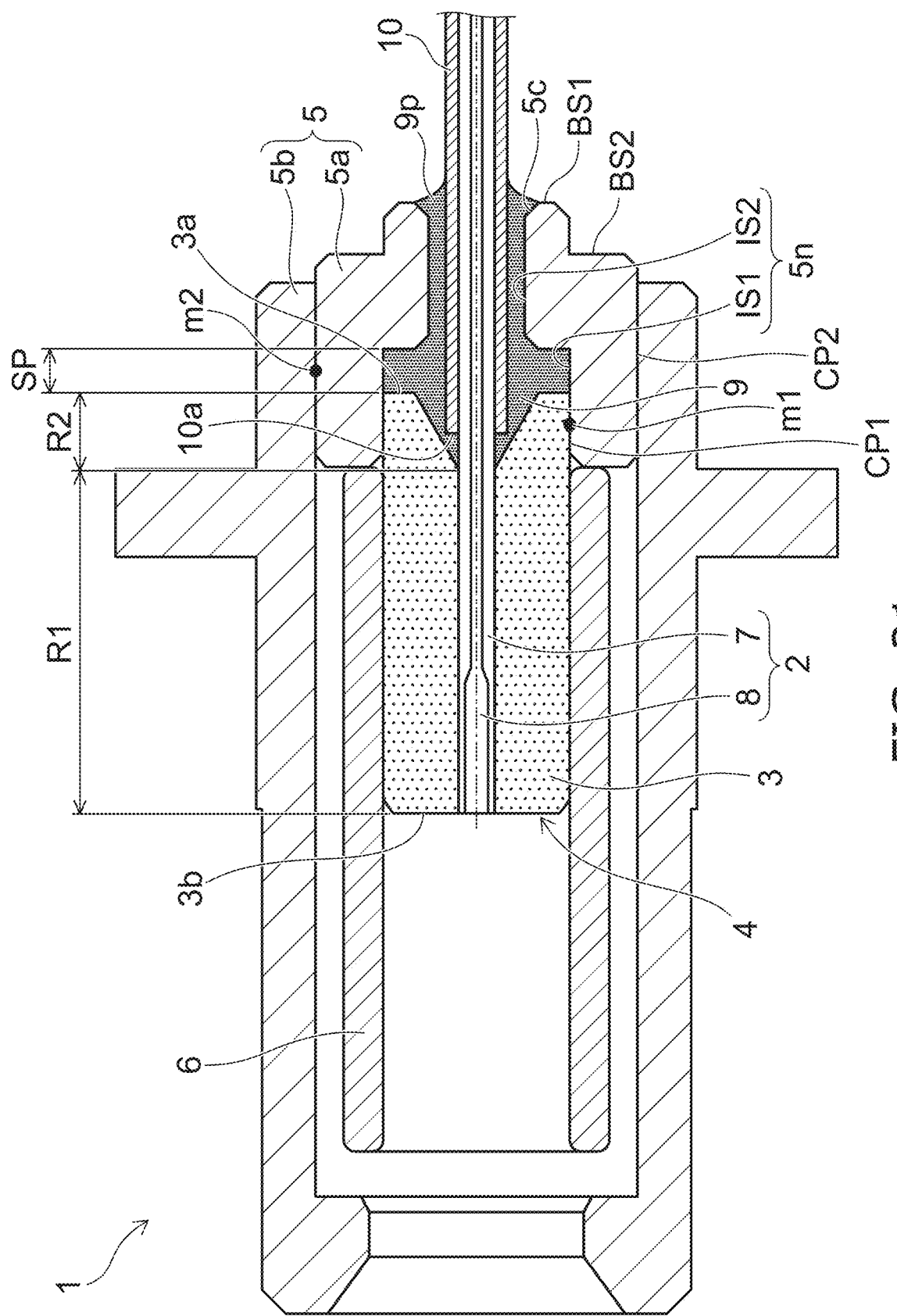
FIG. 21 is a schematic cross-sectional view illustrating a modification of the optical receptacle according to the sixth embodiment of the invention.

FIG. 21 is a schematic cross-sectional view illustrating a modification of the optical receptacle according to the sixth embodiment of the invention.

In the example as illustrated in FIG. 21, the holder 5 (the bush 5a) holds only a portion of the outer side surface of the ferrule 3 on the end surface 3a side of the first region R1. For example, the holder 5 (the bush 5a) holds only a portion of the outer side surface of the ferrule 3 opposing the second region R2. Thereby, the undesirable application of external stress to the second portion 22 due to the press-fitting of the ferrule 3 into the holder 5 (the bush 5a) can be suppressed further.

In the example, the optical receptacle 1 further includes a protective member 10. The protective member 10 covers a portion of the optical fiber 2 extending outside the ferrule 3. The protective member 10 is flexible and flexes in any direction with the optical fiber 2. The protective member 10 includes, for example, a resin material such as a polyester elastomer, an acrylate resin, etc. The outer diameter of the protective member 10 is, for example, about 0.2 mm to 1.0 mm.

A tip 10a of the protective member 10 is positioned inside the second region R2 of the through-hole 3c. The protective member 10 covers a portion of the optical fiber 2 not held by the ferrule 3.

An inner perimeter surface 5n of the bush 5a includes a first inner perimeter portion IS1 and a second inner perimeter portion IS2. The first inner perimeter portion IS1 engages the outer side surface of the ferrule 3. The second inner perimeter portion IS2 is positioned at the rear (the end surface 3a side) of the first inner perimeter portion IS1, protrudes inward from the first inner perimeter portion IS1, and surrounds a portion of the optical fiber 2 and a portion of the protective member 10 around the axis.

The inner diameter of the portion of the first inner perimeter portion IS1 of the bush 5a is substantially the same as the outer diameter of the ferrule 3. On the other hand, the inner diameter of the portion of the second inner perimeter portion IS2 of the bush 5a is smaller than the outer diameter of the ferrule 3. Accordingly, the second inner perimeter portion IS2 is positioned rearward of the end surface 3a of the ferrule 3.

For example, the inner diameter of the portion of the second inner perimeter portion IS2 is set to have a value that is larger than the outer diameter of the protective member 10 and smaller than the outer diameter of the ferrule 3. For example, the inner diameter of the portion of the second inner perimeter portion IS2 is smaller than the opening diameter on the end surface 3a side of the widened through-hole 3c in the second region R2.

A gap SP in the axis direction is provided between the end surface 3a of the ferrule 3 and the second inner perimeter portion IS2. The elastic member 9 is filled also into the gap SP. The distance in the axis direction of the gap SP is, for example, longer than the outer diameter of the optical fiber 2. The distance in the axis direction of the gap SP is, for example, not less than about 0.125 mm and not more than about 0.2 mm. In other words, the distance in the axis direction of the gap SP is the distance in the axis direction between the end surface 3a of the ferrule 3 and the second inner perimeter portion IS2. Also, in other words, the outer diameter of the optical fiber 2 is the length in a direction orthogonal to the axis direction of the optical fiber 2. Other than the first region R1, bubbles of any size may be included in the interior of the elastic member 9 because the optical performance is not affected.

The bush 5a has a first rear end surface BS1 and a second rear end surface BS2. The second rear end surface BS2 is concave further toward the tip side (the end surface 3b side) than the first rear end surface BS1 further on the outer perimeter side than the first rear end surface BS1. For example, the first rear end surface BS1 and the second rear end surface BS2 are planes orthogonal to the axis direction. As described above, the rear end vicinity of the inner perimeter surface 5n of the bush 5a protrudes toward the inside. Thereby, the surface areas of the first rear end surface BS1 and the second rear end surface BS2 can be large.

The bush 5a includes a bevel portion 5c between the first rear end surface BS1 and the second inner perimeter portion IS2 (the inner perimeter surface 5n). In other words, the diameter of the opening on the rear end side of the bush 5a widens toward the rear end side. The bevel portion 5c may be a so-called C-surface in which the corner between the first rear end surface BS1 and the second inner perimeter portion IS2 is polished into a straight line configuration, or may be a so-called R-surface in which the corner between the first rear end surface BS1 and the second inner perimeter portion IS2 is rounded.

The elastic member 9 includes a protruding portion 9p that protrudes outside the bush 5a on the rear end side of the bush 5a and covers the corner portion between the rear end of the bush 5a and the outer side surface of the protective member 10. For example, the outer surface of the protruding portion 9p is concave toward the corner portion side and has a concave curved configuration smoothly connecting the rear end of the bush 5a and the outer side surface of the protective member 10.

The outer side surface of the ferrule 3 includes a first contact portion CP1 contacting the inner perimeter surface 5n of the bush 5a. The outer side surface of the bush 5a includes a second contact portion CP2 contacting the inner perimeter surface of the housing 5b. An intermediate point m2 in the axis direction of the second contact portion CP2 is positioned rearward of an intermediate point m1 in the axis direction of the first contact portion CP1.

In the example, the tip 10a of the protective member 10 is positioned inside the second region R2 of the through-hole 3c. Thereby, the length of the portion of the optical fiber 2 protruding from the protective member 10 can be shortened as much as possible. For example, the flex of the optical fiber 2 can be suppressed; and the optical fiber 2 can be inserted easily into the through-hole 3c of the ferrule 3. For example, the manufacturability of the optical receptacle 1 can be improved.

Also, in the example, the optical fiber 2 and the protective member 10 further extend outside the bush 5a (the holder 5) and are fixedly bonded to the bush 5a by the elastic member 9. Thereby, the deformation and the tilting due to an external force of the portion of the optical fiber 2 protruding from the protective member 10 can be suppressed. Also, the protrusion and conversely the retraction of the tip of the optical fiber 2 from the tip of the ferrule 3 due to the application of the external force can be suppressed.

Also, in the example, the elastic member 9 is filled also into the gap SP between the end surface 3a of the ferrule 3 and the second inner perimeter portion IS2. Thereby, the deformation and/or the positional shift of the tip portion of the optical fiber 2 due to the external force can be suppressed further. Other than the first region R1, bubbles of any size may be included in the interior of the elastic member 9 because the optical performance is not affected.

Also, in the example, the bush 5a has the first rear end surface BS1 and the second rear end surface BS2. Thereby, for example, by using the first rear end surface BS1 as a receiving surface of the bonding agent used to form the elastic member 9, the undesirable flowing of the bonding agent to the second rear end surface BS2 can be suppressed. Also, when press-fitting the bush 5a into the housing 5b, the undesirable occurrence of misalignment between the bush 5a and the housing 5b can be suppressed by performing the press-fitting into the housing 5b by pressing the second rear end surface BS2 by using the second rear end surface BS2 as an alignment surface.

For example, in the case where the coating of the bonding agent and the alignment of the bush 5a are to be performed in the same plane, there is a possibility that the bonding agent may undesirably flow to the alignment surface; and the bush 5a may be undesirably press-fitted deeply into the housing 5b by the amount of the cured bonding agent. By providing the first rear end surface BS1 and the second rear end surface BS2, such a misalignment can be suppressed; and the positional precision between the bush 5a and the housing 5b can be increased.

Also, by providing the gap SP, the distance between the second rear end surface BS2 which is the alignment surface and the end surface 3b of the ferrule 3 which is the PC-surface can be set more accurately. For example, in the case where there is no gap SP and the end surface 3a of the ferrule 3 and the second inner perimeter portion IS2 contact each other, the length from the second rear end surface BS2 to the end surface 3b of the ferrule 3 undesirably changes due to the final quality (the error, the fluctuation, etc.) of the total length dimension of the ferrule 3 and/or the thickness dimension of the bush 5a. Conversely, by providing the gap SP as in the example, the length from the second rear end surface BS2 to the end surface 3b of the ferrule 3 can be set more accurately without being dependent on the final quality of the parts. Thereby, an increase of the reliability and/or the productivity of the optical receptacle 1 can be realized.

Also, in the case where the gap SP is not provided, there is a risk that the ferrule 3 may be undesirably fixed obliquely due to the final quality of the perpendicularity of the end surface 3a of the ferrule 3 and/or the second inner perimeter portion IS2, etc.; the ferrule 3 undesirably may be chipped; and the bush 5a may undesirably deform. By providing the gap SP in the example, the oblique press-fitting of the ferrule 3, the damage and the deformation of the parts, etc., can be suppressed regardless of the final quality of the parts.

The error of the total length dimension of the ferrule 3 is, for example, about ±0.05 mm (a range of 0.1 mm). The error of the thickness dimension of the bush 5a is, for example, about ±0.05 mm (a range of 0.1 mm). In such a case, it is favorable for the distance in the axis direction of the gap SP to be about 0.2 mm. Thus, the distance in the axis direction of the gap SP is set to be longer than the outer diameter of the optical fiber 2. The distance in the axis direction of the gap SP is set to be not less than about 0.125 mm and not more than about 0.2 mm. Thereby, the reliability and/or the productivity of the optical receptacle 1 can be improved further.

Also, the length where the protective member 10 is fixedly bonded can be longer by setting the length of the portion of the first rear end surface BS1 to be longer than the length necessary for the bush 5a to be held by the housing 5b (the length necessary for the press-fitting). Thereby, the deformation and/or the positional shift of the tip portion of the optical fiber 2 can be suppressed further.

Also, by providing the bevel portion 5c between the rear end surface and the inner perimeter surface of the bush 5a in the example, the optical fiber 2 can be inserted easily into the bush 5a; and the manufacturability can be improved. Also, when coating the bonding agent on the first rear end surface BS1, the bevel portion 5c can be used as the bonding agent reservoir; and the undesirable flowing of the bonding agent to the second rear end surface BS2 (the alignment surface) can be suppressed further.

Also, in the example, the elastic member 9 includes the protruding portion 9p. Thereby, the undesirable bending of the optical fiber 2 locally at the corner portion between the rear end of the bush 5a and the outer side surface of the protective member 10 when the load is applied by the external force can be suppressed. For example, the starting point of the bending of the optical fiber 2 can be distal to the boundary portion between the first region R1 and the second region R2.

Also, in the example, the housing 5b holds the bush 5a by press-fitting. Thereby, the holding force can be increased; and the bush 5a can be held appropriately by a simple configuration.

Also, in the example, the intermediate point m2 of the second contact portion CP2 of the bush 5a is positioned rearward of the intermediate point m1 of the first contact portion CP1 of the ferrule 3. Thereby, for example, even in the case where the bush 5a is press-fitted into the housing 5b, etc., the clamping force due to the press-fitting can be dispersed over a wide region by the second contact portion CP2; and the undesirable concentration of the external force in the optical fiber 2 at the boundary portion between the first region R1 and the second region R2 can be suppressed further.

Figure 22:
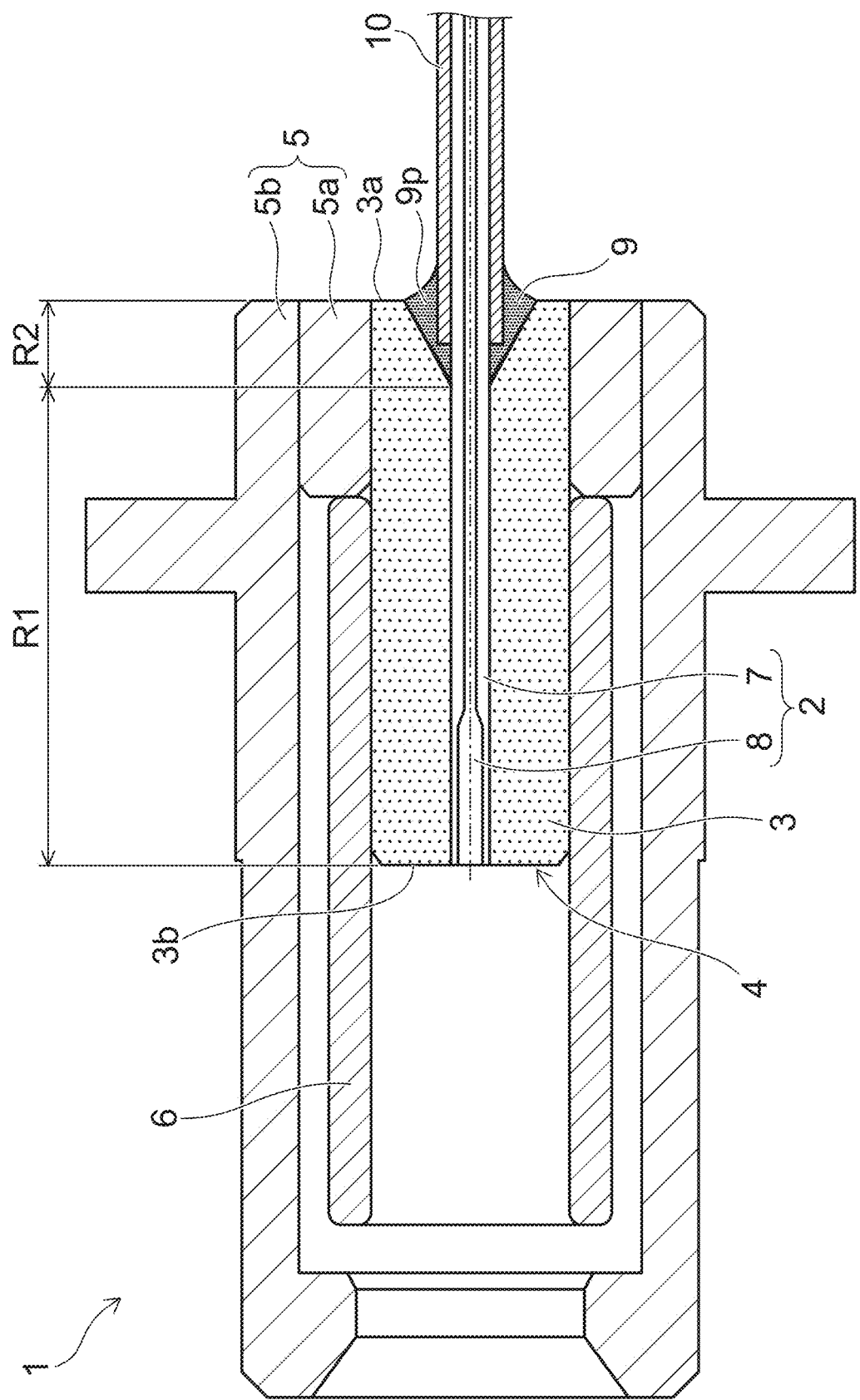
FIG. 22 is a schematic cross-sectional view illustrating a modification of the optical receptacle according to the sixth embodiment of the invention.

FIG. 22 is a schematic cross-sectional view illustrating a modification of the optical receptacle according to the sixth embodiment of the invention.

In the example as illustrated in FIG. 22, the bush 5a holds only the outer side surface of the fiber stub 4. The inner diameter of the bush 5a is substantially constant. The rear end of the bush 5a does not protrude rearward of the end surface 3a. In such a case, at least a portion of the bush 5a holds a portion of the outer side surface of the ferrule 3 opposing the second region R2. The fiber stub 4 may be positioned on the inner side of the bush 5a. Also, in the example, the protruding portion 9p of the elastic member 9 is provided at the corner portion between the end surface 3a of the ferrule 3 and the outer side surface of the protective member 10.

Thus, the member cost of the bush 5a can be suppressed because the bush 5a has a simple configuration. Also, when the optical fiber 2 is bent, the undesirable contact of the optical fiber 2 with the bush 5a also can be suppressed.

Figure 23:
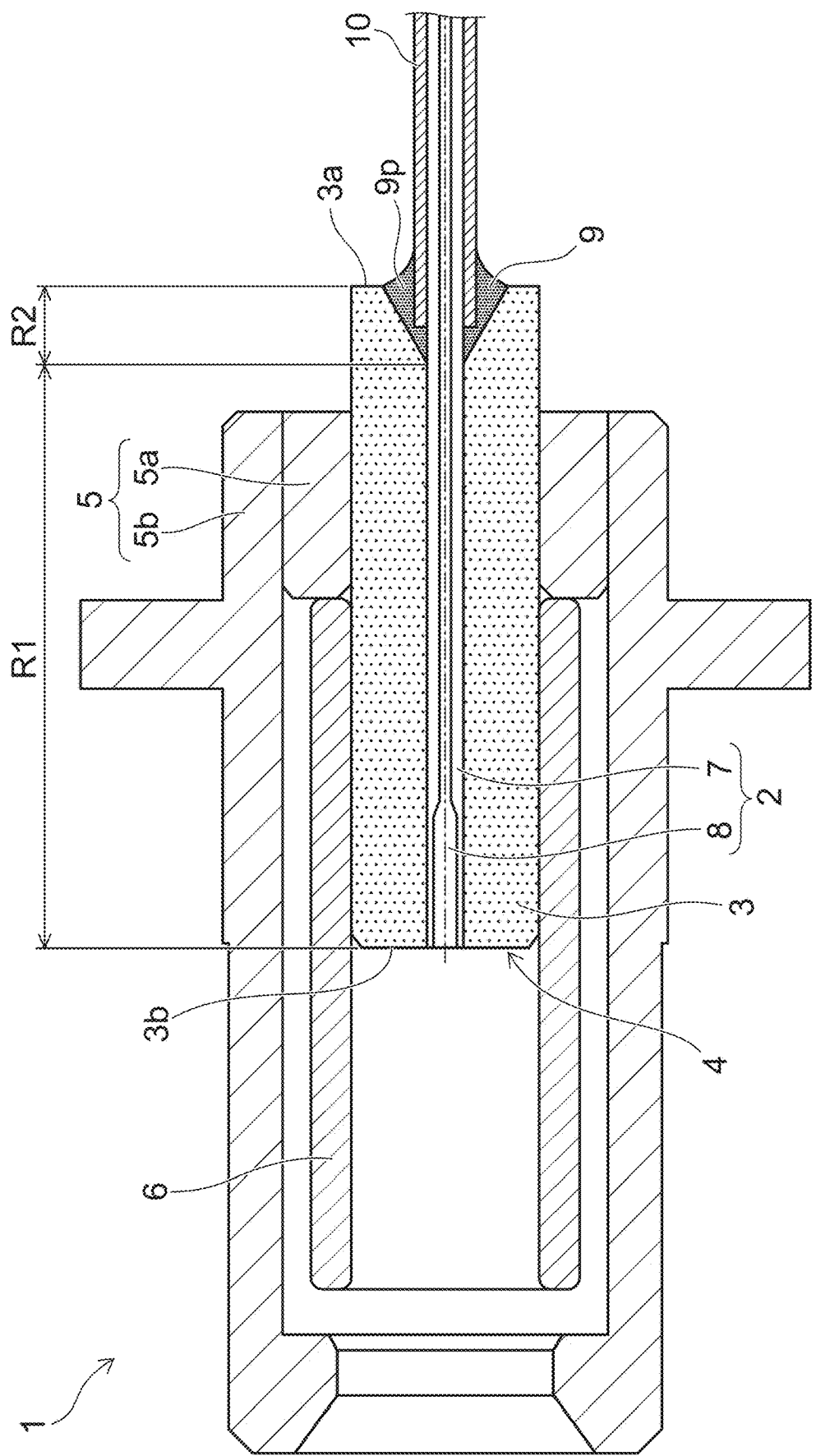
FIG. 23 is a schematic cross-sectional view illustrating a modification of the optical receptacle according to the sixth embodiment of the invention.

FIG. 23 is a schematic cross-sectional view illustrating a modification of the optical receptacle according to the sixth embodiment of the invention.

In the example as illustrated in FIG. 23, the bush 5a holds only a portion of the outer side surface of the ferrule 3 opposing the first region R1. The bush 5a holds a portion of the ferrule 3 frontward of the second region R2. Thereby, similarly to the description recited above, the member cost of the bush 5a can be suppressed; and the undesirable contact of the optical fiber 2 with the bush 5a can be suppressed. Further, the stress that is applied to the boundary portion between the first region R1 and the second region R2 can be relaxed.

Figure 24:
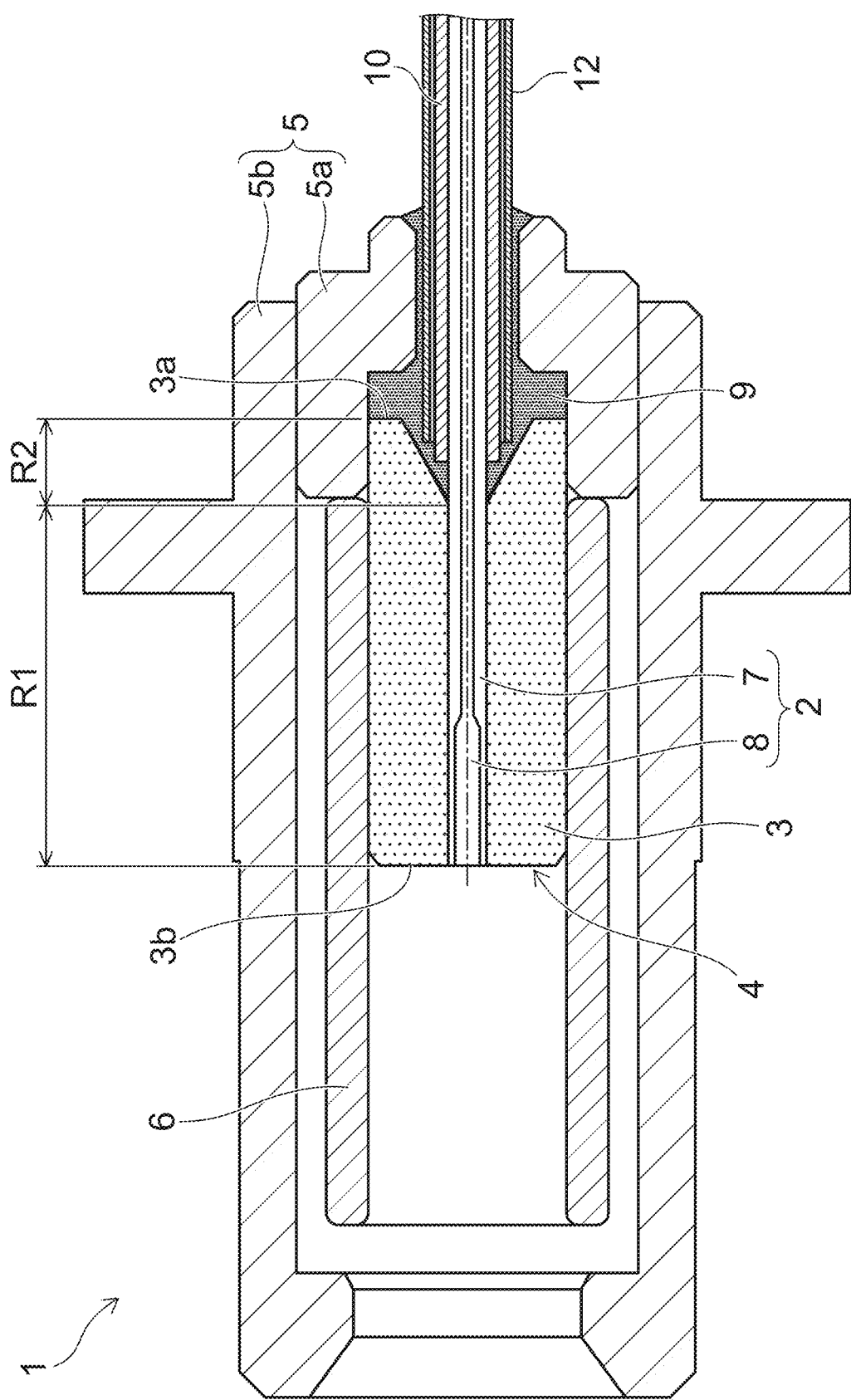
FIG. 24 is a schematic cross-sectional view illustrating a modification of the optical receptacle according to the sixth embodiment of the invention.

FIG. 24 is a schematic cross-sectional view illustrating a modification of the optical receptacle according to the sixth embodiment of the invention.

In the example as illustrated in FIG. 24, the optical receptacle 1 further includes a tube 12. The tube 12 has a tubular configuration covering the outer perimeter of the protective member 10. The tube 12 is flexible. The inner diameter of the tube 12 is slightly larger than the outer diameter of the protective member 10; and a space is provided between the tube 12 and the protective member 10. The tip of the tube 12 is positioned inside the second region R2 of the through-hole 3c. The position of the tip of the tube 12 is not limited thereto and may be any position.

In the case where the protective member 10 directly contacts the holder 5, there is a possibility that cracks may occur in the protective member 10. Also, in the case where an interface between the protective member 10 and the elastic member 9 exists at the rear end of the holder 5, there is a possibility that bending stress may concentrate at the interface and cracks may occur in the protective member 10. By repeating the bending, there is a risk that the cracks that occurred in the protective member 10 may undesirably propagate into the interior of the protective member 10 and reach the cladding 7 of the optical fiber 2.

By providing the tube 12 on the outer side of the protective member 10, the undesirable direct contact of the protective member 10 with the holder 5 can be suppressed. Also, for bending as well, although stress concentration occurs at the interface between the tube 12 and the elastic member 9, a space exists between the tube 12 and the protective member 10; therefore, the propagation of the cracks can be suppressed. Also, because the tube 12 exists independently of the optical fiber 2, the selection of the materials according to the optical characteristics of the optical fiber 2 and the like are not limited; and a bending resistance that is stronger than that of the protective member 10 can be realized by selecting a material that is stronger than the protective member 10.

Figure 25:
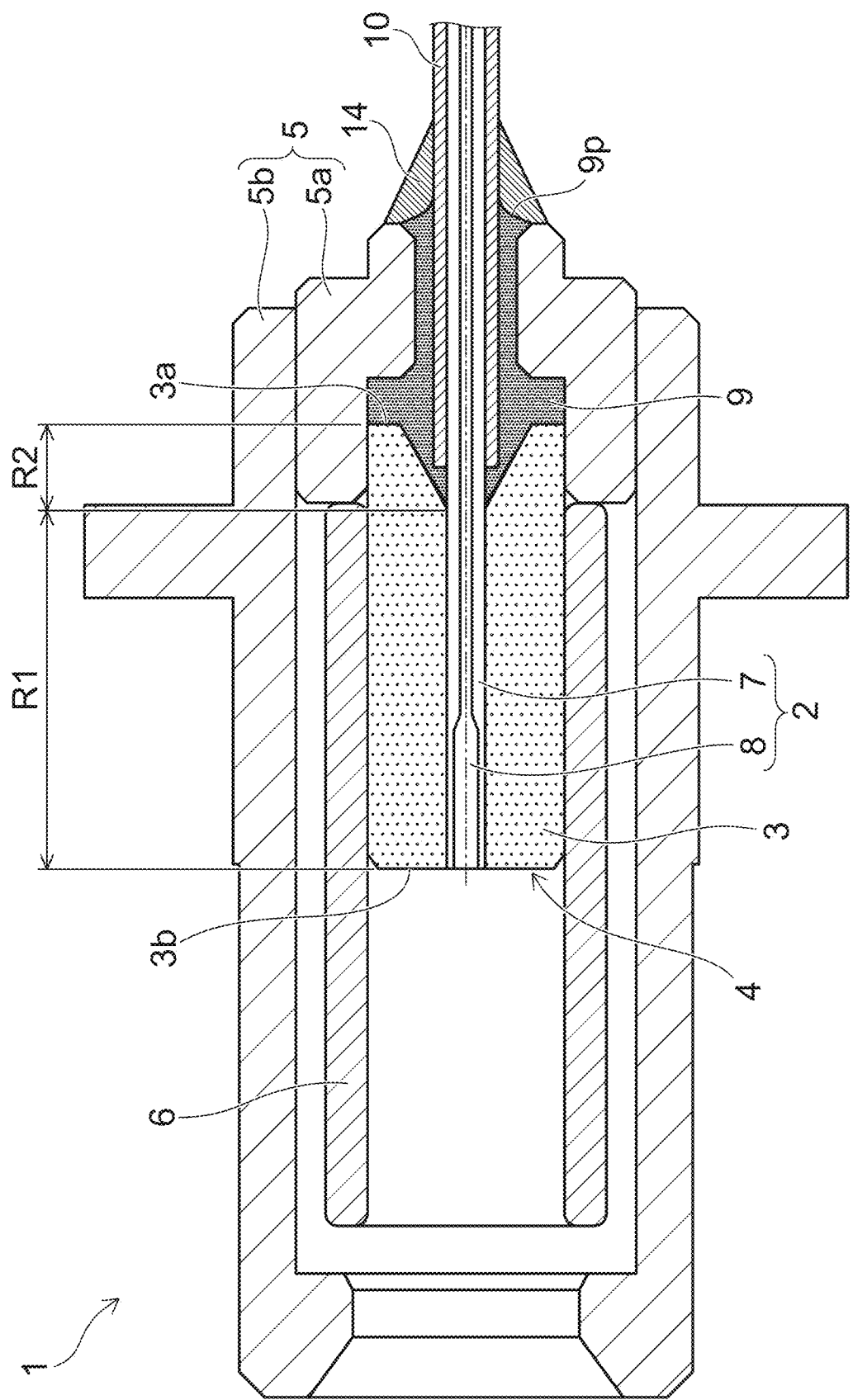
FIG. 25 is a schematic cross-sectional view illustrating a modification of the optical receptacle according to the sixth embodiment of the invention.

FIG. 25 is a schematic cross-sectional view illustrating a modification of the optical receptacle according to the sixth embodiment of the invention.

In the example as illustrated in FIG. 25, the optical receptacle 1 further includes an elastic member 14 (a second elastic member) in addition to the elastic member 9 (the first elastic member).

The elastic member 14 covers the corner portion between the rear end of the holder 5 (the bush 5a) and the outer side surface of the protective member 10. In the case where the elastic member 9 includes the protruding portion 9p, the elastic member 14 covers the protruding portion 9p. For example, the elastic member 14 covers the entire outer surface of the protruding portion 9p. In other words, the elastic member 14 covers the boundary portion between the elastic member 9 and the protective member 10.

The hardness of the elastic member 14 is lower than the hardness of the elastic member 9. In other words, the elastic modulus of the elastic member 14 is smaller than the elastic modulus of the elastic member 9. The hardness of the elastic member 9 is higher than the hardness of the protective member 10. For example, the hardness of the elastic member 14 is about the same as the hardness of the protective member 10. For example, the hardness of the elastic member 14 is not less than 0.8 times and not more than 1.2 times the hardness of the protective member 10. The hardness of the protective member 10 is, for example, about Shore D20-30. In such a case, similarly, the hardness of the elastic member 14 also is about Shore D20-30.

As described above, the protective member 10 includes a resin material such as a polyester elastomer, an acrylate resin, etc. As described above, the elastic member 9 includes a resin material such as an epoxy resin, etc. The elastic member 14 includes, for example, a resin material such as a polyester resin, an acrylic resin, a silicone resin, etc. The elastic member 9 and the elastic member 14 include, for example, a resin bonding agent. In such a case, the hardness of the elastic member 9 and the hardness of the elastic member 14 are hardnesses after the curing of the bonding agent (after completely curing).

It is favorable for the material of the elastic member 9 to have a refractive index optically near that of glass and to be a material having low outgas. Also, when optically connecting to the plug ferrule, it is necessary for the elastic member 9 to have a constant bonding strength such that the optical fiber 2 does not move, etc. On the other hand, it is favorable for the material of the elastic member 14 to include a material having a small elastic modulus to relax the stress. The elastic member 14 is not limited to the end surface of the holder 5 (the bush 5a) and may be disposed over the inner side of the holder 5.

By providing the elastic members 9 and 14 as recited above, when bending acts on the optical fiber 2 at the end portion of the holder 5, stress relief can be realized for the optical properties of the optical fiber 2 and the ferrule 3; and the characteristics of the two can be realized.

SEVENTH EMBODIMENT

FIG. 26A and FIG. 26B are schematic cross-sectional views illustrating an optical receptacle according to a seventh embodiment of the invention.

As illustrated in FIG. 26A and FIG. 26B, the example further includes a fixing member 80. Other than the fixing member 80, the configuration of the optical receptacle illustrated in FIG. 26A and FIG. 26B is substantially the same as that of the optical receptacle described in reference to FIG. 19.

The fixing member 80 is provided on the end surface 2a side of a portion of the first portion 21 protruding from the ferrule 3 and fixes the optical fiber 2. The fixing member 80 is disposed to be separated from the ferrule 3. In other words, the fixing member 80 is disposed to be separated from the end surface 3a of the ferrule 3.

The fixing member 80 includes a foundation portion 81, a lid portion 82, and an elastic member 83. The foundation portion 81 has a substantially rectangular block configuration. A groove 81a is provided in the upper surface of the foundation portion 81. The groove 81a is formed according to the configuration of the optical fiber 2. The foundation portion 81 houses one end of the optical fiber 2 inside the groove 81a. Thereby, the foundation portion 81 supports below the one end of the optical fiber 2. The configuration of the groove 81a is, for example, a V-shaped configuration.

The lid portion 82 is provided on the foundation portion 81 and covers the groove 81a of the foundation portion 81. The lid portion 82 covers above the one end of the optical fiber 2 housed inside the groove 81a. Thus, the fixing member 80 covers the one end of the optical fiber 2 around the axis with the foundation portion 81 and the lid portion 82. The foundation portion 81 and the lid portion 82 of the fixing member 80 include, for example, optical glass such as quartz glass, etc. The materials of the foundation portion 81 and the lid portion 82 may be, for example, a brittle material such as a ceramic, etc., or a metal material such as stainless steel, etc.

The elastic member 83 is provided between the foundation portion 81 and the lid portion 82. Also, the elastic member 83 is filled into the groove 81a. The elastic member 83 fixedly bonds the lid portion 82 and the one end of the optical fiber 2 to the foundation portion 81. Thereby, the one end of the optical fiber 2 is fixed to the fixing member 80. The elastic member 83 includes, for example, an epoxy resin, an acrylic resin, a silicon resin, etc.

A cover 86 is provided on the optical fiber 2. The cover 86 covers a portion of the optical fiber 2 between the ferrule 3 and the fixing member 80. In other words, the cover 86 covers a portion of the optical fiber 2 that is not covered with the ferrule 3 and the fixing member 80. Thereby, the cover 86 protects a portion of the optical fiber 2 exposed from the ferrule 3 and the fixing member 80. The cover 86 includes, for example, a resin material.

For example, the end surface 2a of the optical fiber 2 connected to the optical element is substantially coplanar with the end surface of the foundation portion 81 and the end surface of the lid portion 82. For example, the end surface 2a of the optical fiber 2 may protrude from the end surface of the foundation portion 81 and the end surface of the lid portion 82.

In the case where the light is incident and emitted by providing the optical fiber 2 and the optical element to oppose each other, or in the case where the light is condensed on the end surface 2a of the optical fiber 2 via a lens, etc., the optical fiber 2 that has the small core diameter and the laser light that has the small diameter must be aligned with high precision. Therefore, for example, compared to the alignment of the laser light of 10 µm, the necessary alignment precision is stringent.

FIG. 27A to FIG. 27E are descriptive views illustrating examples of analysis results of the optical receptacle according to the seventh embodiment of the invention.

In the analysis as illustrated in FIG. 27A, the loss of the light is determined for changes in the size of the axial misalignment between the central portion where the light is condensed and the central portion of the core (Axial misalignment), the position in the axis direction of the condensing point of the light (Defocus), and the mode field diameter of the optical fiber 2 (MFD).

FIG. 27B to FIG. 27E are graphs illustrating an example of the analysis results.

As illustrated in FIG. 27B to FIG. 27E, the loss of the light increases as the size of the axial misalignment increases. On the other hand, the loss of the light due to the axial misalignment can be reduced as the defocus amount is increased. Also, there is a tendency for the loss of the light due to the axial misalignment to increase as the mode field diameter of the optical fiber 2 decreases.

Thus, high alignment precision with the optical element is necessary as the core diameter of the optical fiber 2 is reduced. Conversely, by providing the fixing member 80 in the optical receptacle according to the embodiment, the position of the optical fiber 2 can be controlled with high precision even in the case where a portion of the optical fiber 2 that has the small core diameter protrudes from the ferrule 3. For example, the alignment with the optical element can be performed with high precision in a short length of time. For example, the alignment state can be maintained with high precision.

The eccentricity EA of the center of the core 8 at the other end surface (the end surface 3a) on the side opposite to the one end surface (the end surface 3b) optically connected to the plug ferrule is 7 µm or less when the center of the outer diameter of the ferrule 3 is used as a reference. More favorably, the eccentricity EA is 5.6 µm or less.

The light that is irradiated from the optical element such as the semiconductor laser element or the like enters the core 8 most efficiently when the center of the optical element and the center of the core 8 match. During the alignment operation, as long as the light irradiated from the optical element is even slightly incident on the core 8 at the stage of the initial position (the state in which the optical receptacle and the optical element are only mounted mechanically), the center of the optical element can be matched to the center of the core 8 easily by monitoring only the fluctuation of the incident light.

When the light irradiated from the optical element is set to 1 mW, in the case where the light that is incident on the core 8 of the optical receptacle is measured in a state in which the optical element is not irradiating, for example, an incident light amount in a state of fluctuating to be 1 µW or less is measured. It is considered that this is because light inside the measurement environment such as sunlight, illumination light, or the like is incident. Using 1 mW as a reference, 1 µW is −30 dB when converted into loss.

From the loss results of the misalignment between the laser and the optical fiber 2 performed in FIG. 27, −30 dB is roughly calculated to be 5.6 µm in FIG. 27B. By considering the case where the output of the optical element is high, the eccentricity of the core 8 is controlled to be 7 µm or less.

Thereby, when performing the alignment operation with the optical element such as the semiconductor laser element or the like, at least a portion of the light irradiated from the optical element can be incident on the core 8 by merely mounting the optical receptacle and the optical element at the initial positions; and the alignment operation can be easy. Also, by setting the eccentricity EA to be 5.6 µm or less, the alignment operation can be even easier. Thus, for the configuration for setting the eccentricity EA, the configurations in which the core 8 is exposed from the cladding 7 at the end surface 3a and the end surface 3b as illustrated in FIG. 1 to FIG. 3, etc., are particularly effective.

Figure 28:
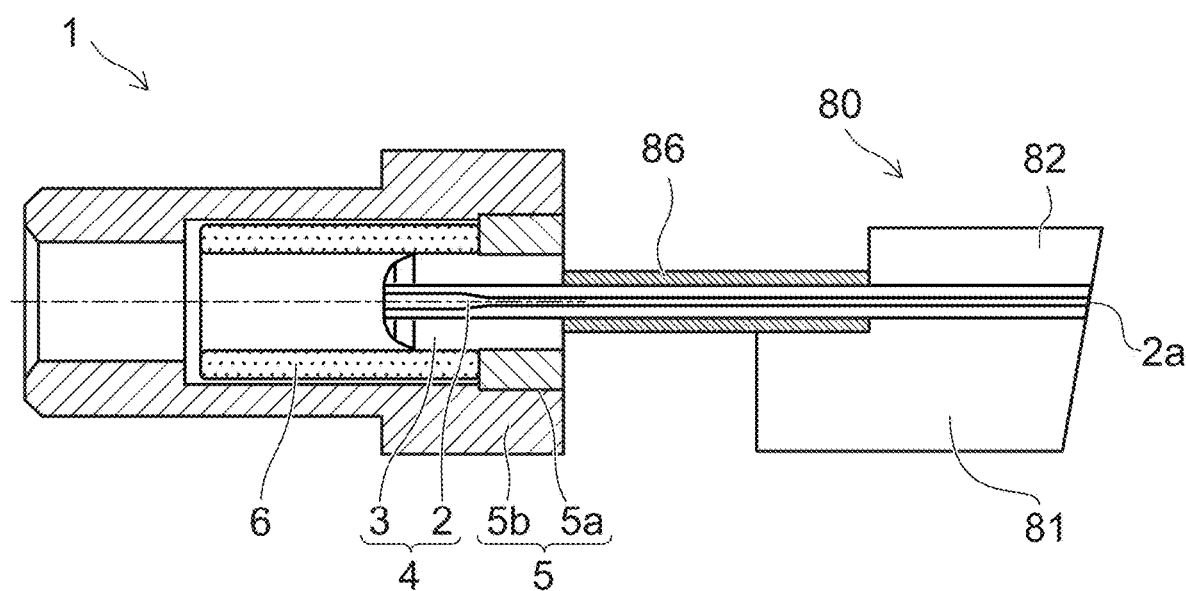
FIG. 28 is a schematic cross-sectional view illustrating a modification of the optical receptacle according to the seventh embodiment of the invention.

FIG. 28 is a schematic cross-sectional view illustrating a modification of the optical receptacle according to the seventh embodiment of the invention.

As illustrated in FIG. 28, the end surface 2a of the optical fiber 2 connected to the optical element, the end surface of the foundation portion 81, and the end surface of the lid portion 82 may be polished obliquely.

EIGHT EMBODIMENT

Figure 29A:
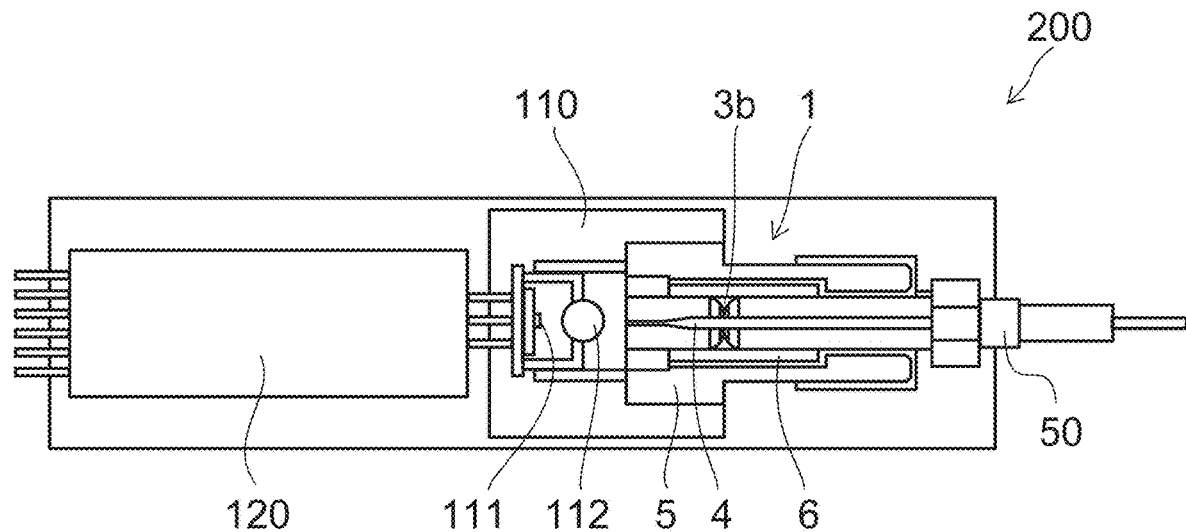
FIG. 29A and FIG. 29B are schematic views illustrating an optical transceiver according to an eighth embodiment of the invention.
Figure 29B:
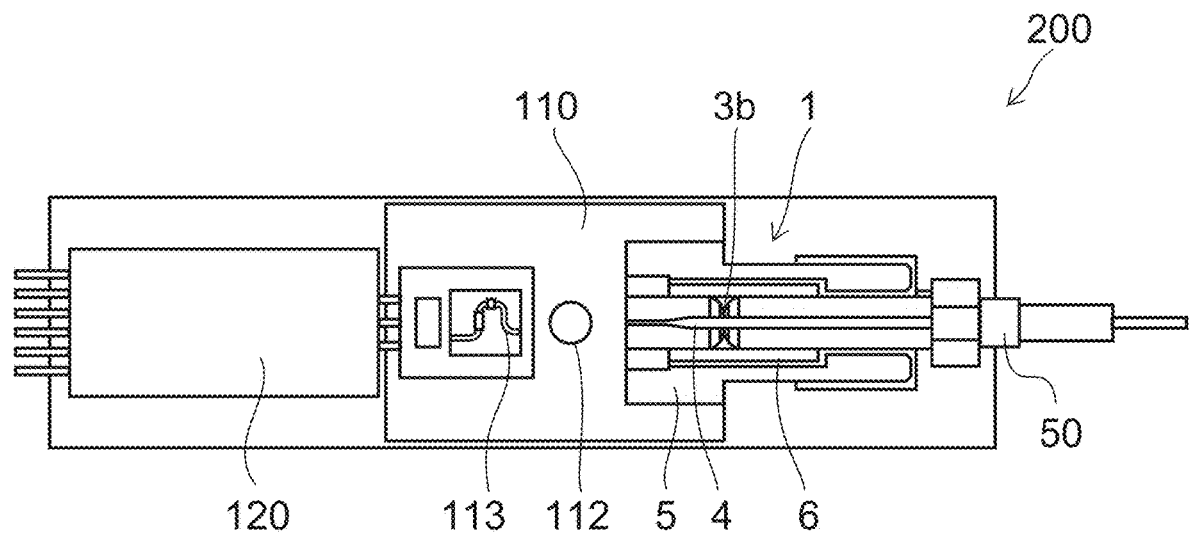

FIG. 29A and FIG. 29B are schematic views illustrating an optical transceiver according to an eighth embodiment of the invention.

As illustrated in FIG. 29A, the optical transceiver 200 according to the embodiment includes the optical receptacle 1, an optical element 110, and a control board 120.

A circuit and the like are formed on the control board 120. The control board 120 is electrically connected to the optical element 110. The control board 120 controls the operation of the optical element 110.

The optical element 110 includes, for example, a light receiving element or a light-emitting element. In the example, the optical element 110 is a light-emitting portion. The optical element 110 includes a laser diode 111 and a lens 112. The laser diode 111 is controlled by the control board 120; and the light is emitted toward the fiber stub 4 of the optical receptacle 1. The lens 112 is positioned between the optical receptacle 1 and the laser diode 111 in the optical path of the emitted light.

As illustrated in FIG. 29B, the optical element 110 may include an element 113. The element 113 includes a laser diode and an optical waveguide having a small core diameter. The light that propagates through the core of the waveguide is incident on the optical receptacle 1 via the lens 112. For example, the optical waveguide is formed using silicon photonics. Also, the optical waveguide may include a quartz waveguide. In the embodiment, the light that is emitted from the laser diode or the optical waveguide may be directly incident on the optical receptacle 1 without providing the lens 112.

Also, a plug ferrule 50 is inserted into the optical receptacle 1. The plug ferrule 50 is held by the sleeve 6. The optical fiber 2 is connected optically to the plug ferrule 50 at the end surface 3b. Thereby, the optical element 110 and the plug ferrule 50 are connected optically via the optical receptacle; and optical communication is possible.

This embodiment includes the following aspects.

[Appendix 1]

An optical receptacle, comprising:
a fiber stub including an optical fiber, a ferrule, and a first elastic member, the optical fiber including cladding and a core for transmitting light, the ferrule having a through-hole where the optical fiber is fixed, the first elastic member fixing the optical fiber in the through-hole;
a holder holding the fiber stub; and
a sleeve, the sleeve being configured to hold the fiber stub at one end and hold a plug ferrule at another end,
the fiber stub having one end surface and another end surface, the one end surface being on a side of the ferrule optically connected to the plug ferrule, the other end surface being on a side opposite to the one end surface,
the optical fiber including a first portion on the other end surface side, a third portion on the one end surface side, and a second portion between the first portion and the third portion,
a core diameter at the first portion being smaller than the core diameter at the third portion,
the core diameter at the second portion increasing from the first portion side toward the third portion side,
the first elastic member being provided between the optical fiber and an inner wall of the through-hole,
the holder holding the other end surface side of the fiber stub,
the sleeve holding the one end surface side of the fiber stub.

[Appendix 2]

The optical receptacle according to appendix 1, wherein
a refractive index of the core at the first portion, the refractive index of the core at the second portion, and the refractive index of the core at the third portion are equal to each other,
a refractive index of the cladding at the first portion is smaller than the refractive index of the cladding at the third portion, and
the refractive index of the cladding at the second portion increases from the first portion side toward the third portion side.

[Appendix 3]

The optical receptacle according to appendix 1, wherein
a refractive index of the cladding at the first portion, the refractive index of the cladding at the second portion, and the refractive index of the cladding at the third portion are equal to each other,
a refractive index of the core at the first portion is larger than the refractive index of the core at the third portion, and
the refractive index of the core at the second portion decreases from the first portion side toward the third portion side.

[Appendix 4]

The optical receptacle according to any one of appendix 1 to appendix 3, wherein the core diameter at the second portion increases linearly from the first portion side toward the third portion side.

[Appendix 5]

The optical receptacle according to any one of appendix 1 to appendix 3, wherein the core diameter at the second portion increases nonlinearly from the first portion side toward the third portion side.

[Appendix 6]

The optical receptacle according to any one of appendix 1 to appendix 3, wherein the core at the second portion includes a level difference at a portion of a region where the core diameter at the second portion increases from the first portion side to the third portion side.

[Appendix 7]

The optical receptacle according to any one of appendix 1 to appendix 6, wherein the core diameter at the first portion is not less than 0.5 µm and not more than 8 µm.

[Appendix 8]

The optical receptacle according to any one of appendix 1 to 7, wherein a difference between a refractive index of the core and a refractive index of the cladding at the first portion is larger than a difference between the refractive index of the core and the refractive index of the cladding at the third portion.

[Appendix 9]
The optical receptacle according to any one of appendix 1 to appendix 8, wherein a difference between a refractive index of the core and a refractive index of the cladding at the first portion is larger than a difference between the refractive index of the core and the refractive index of the cladding at the second portion.

[Appendix 10]
The optical receptacle according to any one of appendix 1 to appendix 9, wherein the core diameter at the third portion is not less than 8 μm and not more than 20 μm.

[Appendix 11]
The optical receptacle according to any one of appendix 1 to appendix 10, wherein a difference between a refractive index of the core and a refractive index of the cladding at the third portion is smaller than a difference between the refractive index of the core and the refractive index of the cladding at the second portion.

[Appendix 12]
The optical receptacle according to any one of appendix 1 to appendix 11, wherein a difference between a refractive index of the core and a refractive index of the cladding at the second portion decreases from the first portion side toward the third portion side.

[Appendix 13]
The optical receptacle according to any one of appendix 1 to appendix 12, wherein an outer diameter of the optical fiber at the first portion is equal to the outer diameter of the optical fiber at the third portion.

[Appendix 14]
The optical receptacle according to any one of appendix 1 to appendix 13, wherein an outer diameter of the optical fiber at the second portion is smaller than the outer diameter of the optical fiber at the first portion.

[Appendix 15]
The optical receptacle according to any one of appendix 1 to appendix 14, wherein an outer diameter of the optical fiber at the second portion is smaller than the outer diameter of the optical fiber at the third portion.

[Appendix 16]
The optical receptacle according to any one of appendix 1 to appendix 15, wherein an axis-direction central portion of the second portion is disposed not to overlap a region where the ferrule and the holder are in contact.

[Appendix 17]
The optical receptacle according to any one of appendix 1 to appendix 16, wherein the first portion, the second portion, and the third portion are disposed inside the through-hole over the entire regions of the first portion, the second portion, and the third portion.

[Appendix 18]
The optical receptacle according to any one of appendix 1 to appendix 17, further comprising a transparent member fixed to the ferrule,
the through-hole including a small diameter portion and a large diameter portion, the large diameter portion being provided on the other end surface side and having a diameter larger than a diameter of the small diameter portion,
the entire optical fiber being disposed in the small diameter portion,
at least a portion of the transparent member being disposed in the large diameter portion,
the first elastic member being provided between the optical fiber and the transparent member.

[Appendix 19]
The optical receptacle according to any one of appendix 1 to appendix 16, wherein
the first portion includes a portion protruding from the ferrule, and
the second portion and the third portion are disposed inside the through-hole over the entire regions of the second portion and the third portion.

[Appendix 20]
The optical receptacle according to appendix 19, wherein
the through-hole of the ferrule includes a first region and a second region, a width in an orthogonal direction of the first region corresponding to a width in the orthogonal direction of the optical fiber, the orthogonal direction being orthogonal to an axis direction of the through-hole, the second region being disposed on the other end surface side of the first region and having a width in the orthogonal direction widening toward the other end surface, and
an axis-direction central portion of the second portion is disposed to overlap the first region.

[Appendix 21]
The optical receptacle according to appendix 19, wherein
the through-hole of the ferrule includes a first region and a second region, a width in an orthogonal direction of the first region corresponding to a width in the orthogonal direction of the optical fiber, the orthogonal direction being orthogonal to an axis direction of the through-hole, the second region being disposed on the other end surface side of the first region and having a width in the orthogonal direction widening toward the other end surface, and
the second portion is disposed to overlap the first region.

[Appendix 22]
The optical receptacle according to any one of appendix 19 to appendix 21, further comprising a fixing member provided on an end surface side of the portion of the first portion protruding from the ferrule, the fixing member fixing the optical fiber,
the fixing member being disposed to be separated from the ferrule.

[Appendix 23]
The optical receptacle according to appendix 20 or appendix 21, wherein the holder holds a portion of an outer side surface of the ferrule on the other end surface side of the first region.

[Appendix 24]
The optical receptacle according to any one of appendix 19 to appendix 23, wherein the holder does not protrude from the other end surface.

[Appendix 25]
The optical receptacle according to appendix 20 or appendix 21, wherein the holder holds only a portion of an outer side surface of the ferrule opposing the first region.

[Appendix 26]
The optical receptacle according to any one of appendix 19 to appendix 25, further comprising:
a protective member covering a portion of the optical fiber extending outside the ferrule; and
a tube covering the protective member,
a space being provided between the protective member and the tube.

[Appendix 27]
The optical receptacle according to any one of appendix 19 to appendix 26, further comprising a second elastic member covering the first elastic member at a portion of the optical fiber extending outside the ferrule,
a hardness of the second elastic member being lower than a hardness of the first elastic member.

[Appendix 28]
The optical receptacle according to any one of appendix 1 to appendix 27, wherein at an end surface of the fiber stub on the side opposite to the side optically connected to the plug ferrule, a portion of an end surface of the ferrule and an end surface of the optical fiber have a prescribed angle from a plane perpendicular to a central axis of the fiber stub.

[Appendix 29]
The optical receptacle according to any one of appendix 1 to appendix 28, wherein the first portion, the second portion, and the third portion are formed as one body.

[Appendix 30]
The optical receptacle according to any one of appendix 1 to appendix 29, wherein a length of the first portion along a central axis of the fiber stub is 5 μm or more.

[Appendix 31]
The optical receptacle according to any one of appendix 1 to appendix 30, wherein a length of the third portion along a central axis of the fiber stub is 5 μm or more.

[Appendix 32]
The optical receptacle according to any one of appendix 1 to appendix 31, wherein
the optical fiber includes, at the second portion, a finest portion where an outer diameter is smallest,
a change of an inner diameter of the through-hole is smaller than a change of the outer diameter of the optical fiber,
a thickness of the first elastic member is largest at the finest portion, increases gradually from the first portion toward the finest portion, and increases gradually from the third portion toward the finest portion, and
in an axis direction of the optical fiber, a length of the first elastic member provided between the second portion and the inner wall is shorter than at least one of the length in the axis direction of the first elastic member provided between the first portion and the inner wall or the length in the axis direction of the first elastic member provided between the third portion and the inner wall.

[Appendix 33]
The optical receptacle according to any one of appendix 1 to appendix 32, wherein an eccentricity of a center of the core at the other end surface is 7 μm or less when a center of an outer diameter of the ferrule is used as a reference.

[Appendix 34]
The optical receptacle according to any one of appendix 1 to appendix 33, wherein in a direction orthogonal to an axis direction of the optical fiber, a displacement amount between the cladding at the first portion and the cladding at the third portion is 4 μm or less.

[Appendix 35]
An optical transceiver, comprising the optical receptacle according to any one of appendix 1 to appendix 34.

Embodiments of the invention are described hereinabove. However, the invention is not limited to these descriptions. Appropriate design modifications made by one skilled in the art for the embodiments described above also are within the scope of the invention to the extent that the features of the invention are included. For example, the configurations, the dimensions, the materials, the arrangements, etc., of the components included in the fiber stub 4 and the like, the mounting methods of the optical fiber 2 and the ferrule 3, etc., are not limited to those illustrated and can be modified appropriately.

Also, the components included in the embodiments described above can be combined within the limits of technical feasibility; and such combinations also are within the scope of the invention to the extent that the features of the invention are included.

What is claimed is:
1. An optical receptacle, comprising:
a fiber stub including an optical fiber, a ferrule, and a first elastic member, the optical fiber including cladding and a core for transmitting light, the ferrule having a through-hole where the optical fiber is fixed, the first elastic member fixing the optical fiber in the through-hole;
a holder holding the fiber stub; and
a sleeve, the sleeve being configured to hold the fiber stub at one end and hold a plug ferrule at another end,
the fiber stub having one end surface and another end surface, the one end surface being on a side of the ferrule optically connected to the plug ferrule, the other end surface being on a side opposite to the one end surface,
the optical fiber including a first portion on the other end surface side, a third portion on the one end surface side, and a second portion between the first portion and the third portion,
the first portion extending in an axis direction, the axis direction being a direction in which the first portion, the second portion, and the third portion are arranged,
the second portion extending in the axis direction,
the third portion extending in the axis direction,
a core diameter at the first portion being smaller than the core diameter at the third portion,
the core diameter at the second portion increasing from the first portion side toward the third portion side,
a change of the core diameter at the first portion in the axis direction being smaller than a change of the core diameter at the second portion in the axis direction,
a change of the core diameter at the third portion in the axis direction being smaller than the change of the core diameter at the second portion in the axis direction,
the first elastic member being provided between the optical fiber and an inner wall of the through-hole,
the holder holding the other end surface side of the fiber stub,
the sleeve holding the one end surface side of the fiber stub,
the optical fiber including, at a central portion in the axis direction of the second portion,
a finest portion where an outer diameter is smallest,
a change of an inner diameter of the through-hole being smaller than a change of the outer diameter of the optical fiber,
a thickness of the first elastic member being largest at the finest portion, increasing gradually from the first portion toward the finest portion, and increasing gradually from the third portion toward the finest portion,
the core diameter at the first portion being 10 μm or less and 0.5 to 4 μm smaller than an incident beam waist, and
a length of the second portion in the axis direction being 100 μm or more.

2. The optical receptacle according to claim 1, wherein a refractive index of the core at the first portion, the refractive index of the core at the second portion, and the refractive index of the core at the third portion are equal to each other, a refractive index of the cladding at the first portion is smaller than the refractive index of the cladding at the third portion, and the refractive index of the cladding at the second portion increases from the first portion side toward the third portion side.

3. The optical receptacle according to claim 1, wherein a refractive index of the cladding at the first portion, the refractive index of the cladding at the second portion, and the refractive index of the cladding at the third portion are equal to each other, a refractive index of the core at the first portion is larger than the refractive index of the core at the third portion, and the refractive index of the core at the second portion decreases from the first portion side toward the third portion side.

4. The optical receptacle according to claim 1, wherein the core at the second portion includes a level difference at a portion of a region where the core diameter at the second portion increases from the first portion side to the third portion side.

5. The optical receptacle according to claim 1, wherein a difference between a refractive index of the core and a refractive index of the cladding at the first portion is larger than a difference between the refractive index of the core and the refractive index of the cladding at the third portion.

6. The optical receptacle according to claim 1, wherein a difference between a refractive index of the core and a refractive index of the cladding at the first portion is larger than a difference between the refractive index of the core and the refractive index of the cladding at the second portion.

7. The optical receptacle according to claim 1, wherein a difference between a refractive index of the core and a refractive index of the cladding at the second portion decreases from the first portion side toward the third portion side.

8. The optical receptacle according to claim 1, wherein an outer diameter of the optical fiber at the second portion is smaller than the outer diameter of the optical fiber at the first portion.

9. The optical receptacle according to claim 1, wherein an outer diameter of the optical fiber at the second portion is smaller than the outer diameter of the optical fiber at the third portion.

10. The optical receptacle according to claim 1, further comprising a transparent member fixed to the ferrule, the through-hole including a small diameter portion and a large diameter portion, the large diameter portion being provided on the other end surface side and having a diameter larger than a diameter of the small diameter portion, the entire optical fiber being disposed in the small diameter portion, at least a portion of the transparent member being disposed in the large diameter portion, the first elastic member being provided between the optical fiber and the transparent member.

11. The optical receptacle according to claim 1, wherein the first portion includes a portion protruding from the ferrule, and the second portion and the third portion are disposed inside the through-hole over the entire regions of the second portion and the third portion.

12. The optical receptacle according to claim 11, wherein the through-hole of the ferrule includes a first region and a second region, a width in an orthogonal direction of the first region corresponding to a width in the orthogonal direction of the optical fiber, the orthogonal direction being orthogonal to an axis direction of the through-hole, the second region being disposed on the other end surface side of the first region and having a width in the orthogonal direction widening toward the other end surface, and an axis-direction central portion of the second portion is disposed to overlap the first region.

13. The optical receptacle according to claim 11, wherein the through-hole of the ferrule includes a first region and a second region, a width in an orthogonal direction of the first region corresponding to a width in the orthogonal direction of the optical fiber, the orthogonal direction being orthogonal to an axis direction of the through-hole, the second region being disposed on the other end surface side of the first region and having a width in the orthogonal direction widening toward the other end surface, and the second portion is disposed to overlap the first region.

14. The optical receptacle according to claim 11, further comprising a fixing member provided on an end surface side of the portion of the first portion protruding from the ferrule, the fixing member fixing the optical fiber, the fixing member being disposed to be separated from the ferrule.

15. The optical receptacle according to claim 12, wherein the holder holds a portion of an outer side surface of the ferrule on the other end surface side of the first region.

16. The optical receptacle according to claim 12, wherein the holder holds only a portion of an outer side surface of the ferrule opposing the first region.

17. The optical receptacle according to claim 11, further comprising: a protective member covering a portion of the optical fiber extending outside the ferrule; and a tube covering the protective member, a space being provided between the protective member and the tube.

18. The optical receptacle according to claim 1, wherein the first portion, the second portion, and the third portion are formed as one body.

19. The optical receptacle according to claim 1, wherein in the axis direction of the optical fiber, a length of the first elastic member provided between the second portion and the inner wall is shorter than at least one of the length in the axis direction of the first elastic member provided between the first portion and the inner wall or the length in the axis direction of the first elastic member provided between the third portion and the inner wall.

20. The optical receptacle according to claim 1, wherein the core diameter of the first portion is substantially constant in the axis direction, and the core diameter of the third portion is substantially constant in the axis direction.

* * * * *